(12) United States Patent
Cahall et al.

(10) Patent No.: US 10,877,354 B2
(45) Date of Patent: Dec. 29, 2020

(54) LENS ATTACHMENT FOR IMPARTING STRAY LIGHT EFFECTS

(71) Applicants: Scott C. Cahall, Fairport, NY (US); Mark Bridges, Spencerport, NY (US); Julie Gerstenberger, Rochester, NY (US); Heidi Hall, Webster, NY (US)

(72) Inventors: Scott C. Cahall, Fairport, NY (US); Mark Bridges, Spencerport, NY (US); Julie Gerstenberger, Rochester, NY (US); Heidi Hall, Webster, NY (US)

(73) Assignee: Moondog Optics, Inc., Fairport, NY (US)

( * ) Notice: Subject to any disclaimer, the term of this patent is extended or adjusted under 35 U.S.C. 154(b) by 298 days.

(21) Appl. No.: 15/897,171

(22) Filed: Feb. 15, 2018

(65) Prior Publication Data

US 2018/0239222 A1  Aug. 23, 2018

Related U.S. Application Data

(60) Provisional application No. 62/460,376, filed on Feb. 17, 2017.

(51) Int. Cl.
| | | |
|---|---|---|
| G02B 3/02 | (2006.01) | |
| G03B 17/14 | (2006.01) | |
| G02B 7/02 | (2006.01) | |
| H04N 5/225 | (2006.01) | |
| G02B 9/04 | (2006.01) | |
| G02B 13/20 | (2006.01) | |
| G02B 15/10 | (2006.01) | |

(52) U.S. Cl.
CPC .......... *G03B 17/14* (2013.01); *G02B 7/02* (2013.01); *G02B 7/021* (2013.01); *G02B 9/04* (2013.01); *G02B 13/20* (2013.01); *G02B 15/10* (2013.01); *H04N 5/2254* (2013.01)

(58) Field of Classification Search
CPC ...................................................... G03B 17/14
USPC ........................................................ 359/717
See application file for complete search history.

(56) References Cited

U.S. PATENT DOCUMENTS

| | | | |
|---|---|---|---|
| 6,404,563 B1 | 6/2002 | Wildy | |
| 2011/0043623 A1* | 2/2011 | Fukuta | H04N 5/2254 348/135 |
| 2013/0128084 A1 | 5/2013 | Vinogradov et al. | |
| 2014/0210844 A1 | 7/2014 | Hullin et al. | |

FOREIGN PATENT DOCUMENTS

EP  1672419  3/2007

* cited by examiner

*Primary Examiner* — James C. Jones
(74) *Attorney, Agent, or Firm* — Louis S. Horvath

(57) ABSTRACT

A removable camera lens attachment has at least two optical elements, wherein the at least two optical elements are aligned to share an optical axis with a prime lens of the camera. The lens attachment has at least two curved surfaces. The at least two optical elements have a first surface that is conditioned to reflect a first portion of the incident light away from the image plane as reflected stray light and a second surface that is conditioned to reflect a second portion of the reflected stray light back toward the image plane to form a ghost image on an image plane of the prime lens. The lens attachment alters the effective focal length of the prime lens by no more than 15%.

17 Claims, 28 Drawing Sheets

SURFACE DATA SUMMARY:

| Surf Comment | Type | Radius | Thickness | Glass | Diameter | Conic |
|---|---|---|---|---|---|---|
| OBJ | STANDARD | Infinity | Infinity | | 0 | 0 |
| 1 | STANDARD | Infinity | 1 | | 44.69318 | 0 |
| 2 | STANDARD | 23.14964 | 1.648114 | S-TIM8 | 33.90624 | 0 |
| 3 | STANDARD | 16.87051 | 6.753313 | | 29.6609 | 0 |
| 4 | STANDARD | 44.91659 | 4.112277 | S-TIM8 | 27.88814 | 0 |
| 5 | STANDARD | 17.76222 | 2.622859 | | 22.56096 | 0 |
| 6 | STANDARD | 12.86578 | 4.773546 | S-TIL25 | 19.60677 | 0 |
| 7 | STANDARD | 29.64706 | 9.657388 | | 18.06834 | 0 |
| STO | STANDARD | Infinity | 0.826 | | 2.4 | 0 |
| 19 | PARAXIAL | — | 4.13 | | 4.69856 | — |
| IMA | STANDARD | Infinity | | | 6.12 | 0 |

*FIG. 21*

LENS ATTACHMENT FOR IMPARTING STRAY LIGHT EFFECTS

CROSS REFERENCE TO RELATED APPLICATIONS

The present application claims the benefit of U.S. Provisional application Ser. No. 62/460,376, provisionally filed on Feb. 17, 2017 entitled "LENS ATTACHMENT FOR IMPARTING STRAY LIGHT EFFECTS" in the names of Scott C. Cahall, Mark Bridges, Julie Gerstenberger, and Heidi Hall.

FIELD OF THE INVENTION

The present disclosure relates generally to camera optics and more particularly to a lens attachment for imparting stray light effects to an acquired image.

BACKGROUND OF THE INVENTION

Sources of stray light in camera systems can include (i) reflections from non-optical surfaces (such as lens edges or mechanical parts); (ii) scattering from impurities or inhomogeneity within optical materials (e.g., within the glass of a lens); (iii) scattering from dust or fingerprints, or from less-than-perfect surface finishes on optical surfaces; and (iv) reflections from optical surfaces. Where reflections introduce stray light, a typical sequence has light entering the optical system, reflecting off one or more lens surfaces, and finally impinging onto the imaging sensor or film. Depending on the details of the optical design, doubly or multiply reflected light may form a secondary image (in focus or out of focus) superimposed onto the normal scene image. This secondary image is generally less intense than the scene image and is commonly known as a "ghost image."

As a general rule of optical design, stray light in all of its forms (including, for example, ghost images, veiling glare due to scattering, or reflections from non-optical surfaces) is considered highly undesirable within the imaging path. Stray light can be particularly pronounced when a very bright light source, such as the sun, shines into a camera lens. Historically, considerable design effort has been expended in order to develop improved coatings, filters, hoods, blackening methods, and lens arrangements that prevent or at least minimize stray light within the imaging apparatus and in an acquired image. As a matter of standard practice, modern lenses for any type of imaging system are designed to have high-quality coatings with very low reflection in order to reduce stray reflection and eliminate ghost images.

Cinematographers, however, began to appreciate stray light or "flare" as an aesthetic effect, particularly around the early 1970s, as flare effects were considered a way to portray a scene as more realistic or "genuine", rather than suggesting controlled studio lighting conditions. Lens flare is now commonly used by movie directors as an enhancement of scene content, such as where very bright light sources are shown in a dimly lit scene or where highly reflective surfaces reflect bright sunlight, for example. These sources can be placed both inside and outside the camera's field of view (FOV) to purposely create the desired flare effects within a scene. The ghost images generated intentionally as lens flare are typically preferred to be at least slightly out of focus.

Because optical design practices are intended to eliminate flare, the opposite task of purposely generating flare has required some ingenuity on the part of cinematographers. In some cases, filmmakers are known to search out and use older "vintage" lenses with lower quality coatings in order to enhance stray light (specifically ghost images) in the recorded image. Earlier lenses, however, are in limited supply, of variable quality, and often present challenges in mounting to modern cameras. Flare effects obtained from vintage lenses can be difficult to predict and control.

Faced with difficulties of obtaining suitable vintage lenses, filmmakers and photographers have turned to other methods to intentionally introduce stray light into the imaging path. Components adapted for this purpose include filters that are conditioned to cause scattering under suitable conditions when disposed in the optical path. Various trick techniques have also been tried, such as applying petroleum jelly or other suitable material to a filter to cause stray light. Although these filter-based methods can generate scatter effects, they cannot generate ghost images with the look and feel of those typically caused from within the lens itself.

As another alternative, post-production technology has also been used to artificially introduce ghost images and other lighting effects. However, even highly skilled post-production efforts are time-consuming and costly and often lack the genuine character of authentic flare.

Additional solutions that have been proposed for inducing stray light into the optical system have proved to be limited in capability and performance. The use of translucent light-scattering materials in aperture or diaphragm design is relatively complex and costly, requiring design of a compound lens or lens adapter that includes manual adjustment for achieving a desired flare effect. The use of proposed lens or filter attachments, characterized by the addition of thread-like or beaded materials within the filter or lens, is limited in the effects that can be achieved. Moreover, the addition of other materials into the optical path can have undesirable effects on color and image quality.

Thus, it can be seen that there would be utility in a camera lens attachment (i.e., an attachment to a camera's prime lens, which may be fixed or variable focal length, such as a zoom lens) that replicates the genuine look of ghost images but does not otherwise perceptibly degrade the image quality of the camera lens, such as due to image softening or other unwanted effects from added particulates or foreign materials within the lens.

SUMMARY OF THE INVENTION

An object of the present disclosure is to advance the art of camera optics. Embodiments of the present disclosure address the need for a camera lens attachment that imparts stray light to the acquired image content under appropriate conditions. Advantageously, embodiments of the present disclosure have zero or nearly zero optical power and do not cause significant distortion or image degradation of the acquired image or cause other problems related to light dispersion.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to an embodiment of the present disclosure, there is provided a removable camera lens attachment comprising at least two optical elements, wherein the at least two optical elements are aligned to share an optical axis with a prime lens of the camera, wherein the lens attachment has at least two curved surfaces, wherein the at least two optical elements have a first surface that is conditioned to reflect a first portion of the incident light away from the image plane as reflected stray light and a second surface that is conditioned to reflect a second portion of the reflected stray light back toward the image plane to form a ghost image on an image plane of the prime lens, wherein the lens attachment alters the effective focal length of the prime lens by no more than 15%.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

FIG. 21 lists surface and fabrication details for the exemplary embodiment of FIG. 1.

DETAILED DESCRIPTION OF THE INVENTION

Figure 1:
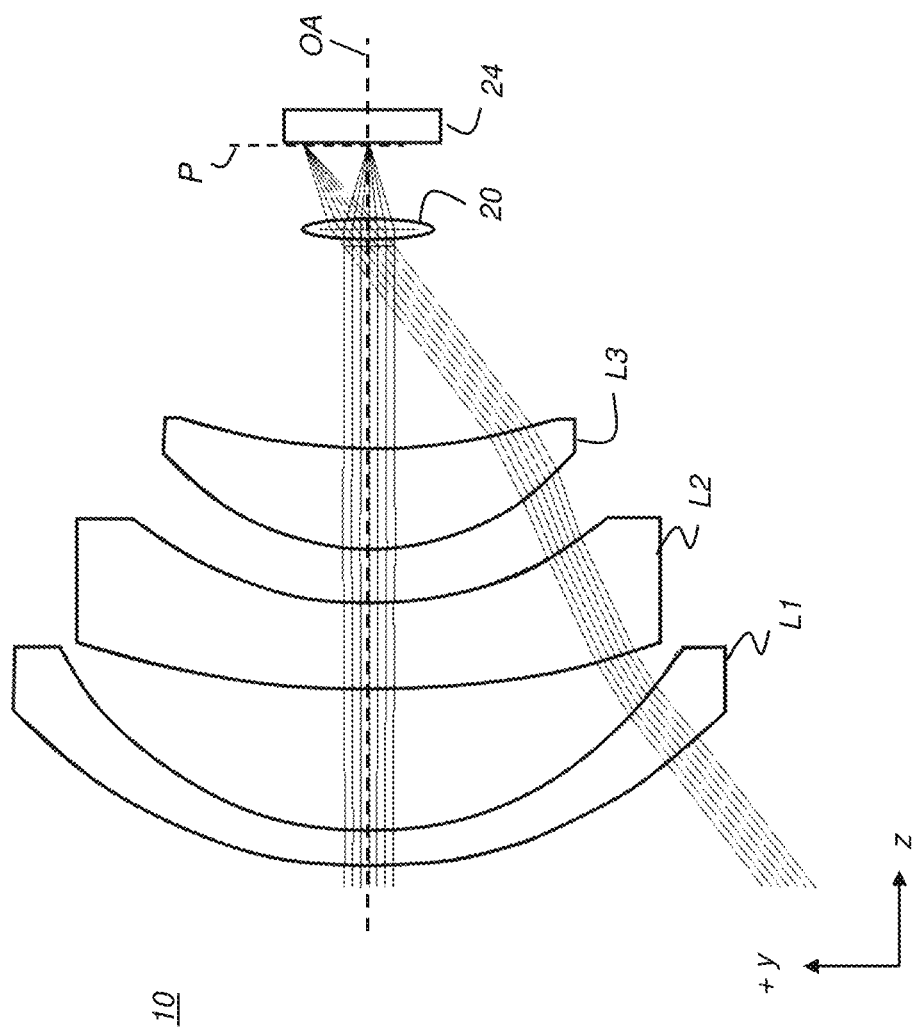
FIG. 1 is a side view of the lens attachment for imparting flare according to an embodiment of the present disclosure.

The following is a detailed description of the preferred embodiments of the invention, reference being made to the drawings in which the same reference numerals identify the same elements of structure in each of the several figures.

Where they are used, the terms "first", "second", and so on, do not necessarily denote any ordinal, sequential, or priority relation, but are simply used to more clearly distinguish one element or set of elements from another, unless specified otherwise. In the context of the present disclosure, the terms "viewer", "operator", and "user" are considered to be equivalent and refer to the person who views content and enters commands on a computer or handheld device display.

In the context of the present disclosure, the term "coupled" is intended to indicate a mechanical association, connection, relation, or linking, between two or more components, such that the disposition of one component affects the spatial disposition of a component to which it is coupled. For mechanical coupling, two components need not be in direct contact, but can be linked through one or more intermediary components. Coupling can use various mechanisms, including one or more clips, suction cups, magnets, mechanical fittings, threads, hook and loop or fiber linkages such as Velcro™, a product of Velcro Companies, or other removable fasteners.

In the context of the present disclosure, the term "optics" is used generally to refer to lenses and other refractive, diffractive, and reflective components or apertures used for shaping and/or repositioning light. An individual component of this type is termed an optic.

Optical power is the inverse of focal length. A lens with infinite focal length has zero optical power. In the context of the present disclosure, "substantially zero optical power" with respect to an attachment lens can be considered to mean an attachment lens which alters the focal length of a prime lens by a factor of less than 15%. By way of example, for a prime lens having a 100 mm focal length, an attachment would be considered to have substantially zero optical power if the resulting focal length of the combined prime+attachment system were no shorter than 85 mm and no longer than 115 mm.

In the context of the present disclosure, the general terms "personal portable communications device" or, more simply, "personal communications device" or "portable communications device" or "handheld communications device" are broadly used to encompass any of a number of types of wireless mobile or portable personal communications devices that are carried by a user and that include a camera and a display that shows images acquired by the camera, including cellular phones, so-called "smartphones" that provide some type of mobile operating system with image capture and display, feature phones having at least some measure of computing and display capability, and various types of wireless, networked electronic pads, tablets, and similar devices that include a camera.

Embodiments of the present disclosure can be designed for use with various types of "host" cameras, including cameras that acquire film and digital images, such as on a CCD (charge-coupled device) sensor array or a CMOS (complementary metal-oxide-semiconductor) sensor array, for example. Embodiments of the present disclosure can be used with a camera that captures still or moving images. Host cameras that can be used with embodiments of the present disclosure include a stand-alone camera or a camera that is part of a smartphone, computer tablet, or other hand-held personal communications device, or a camera that is incorporated into a so-called "drone" device, or a camera that is part of a multi-camera rig for virtual/augmented/mixed reality capture, for example. The host camera could also include a host camera with an existing attachment lens of some other form, for example, to which the disclosed attachment lens is additionally attached. Each type of imaging device has a prime lens at the input of its optical path, wherein the prime lens, in combination with the camera's image sensor, defines the field of view (FOV) of the camera's optical system. In the context of the present disclosure, the term prime lens refers to either a fixed focal length lens or a variable focal length lens (e.g, zoom lens), along with any zero-power filters/windows, and supporting mechanics or light-limiting mechanics. The prime lens can have a single lens element or multiple lens elements.

In the context of the present disclosure, the related terms "flare" and "ghost" are used interchangeably to indicate effects that can appear at the image plane from stray light that reflects from surfaces within the optical assembly.

In the context of the present disclosure, a "ghost image" is generated at the image plane by stray light that is conveyed to the image plane after two or more reflections from surfaces of lenses or other transmissive optics. A ghost image is formed by stray light reflected within the optical assembly and may be in focus or out of focus at the image plane.

In the context of the present disclosure, image content showing 2× or greater spot growth is considered to be out of focus.

Optical Characteristics of Flare Attachment

Particular embodiments of the present disclosure address the need for a lens attachment that, in cooperation with the prime lens of a host camera, imparts stray light effects to the acquired image, generating image flare as an intended effect, for capture by the camera. In order to provide this added capability, the Applicants have designed lens attachment solutions that provide stray light effects and that have the following characteristics:

(i) Little or no perceptible additional distortion or other image aberrations vs. the prime lens alone. In practice, distortion from the flare attachment described herein is as low as possible, preferably no more than 5%. Nominal image blur of a point source image by the system with the attachment of the present disclosure is as low as possible, no more than about 4× (preferably no more than about 2×) that of the nominal image blur of the prime lens alone over 60% of the image.

(ii) Very low optical power. A design goal for the lens attachment is to exhibit substantially zero optical power, so that the lens attachment has little or no perceptible effect on the imaging characteristics of the host camera. When designed following this guideline, the lens attachment can be placed on or removed from the prime lens at will (to impart or remove the stray light effect), with little to no perceptible change in the nominal image quality of the host camera. The net power of the optical attachment affects the EFL (effective focal length) of the prime lens by less than 15%, preferably by less than 10%, even more preferably by less than 5%.

(iii) At a minimum, the lens attachment for ghost or flare effects has two optical elements and has a total of at least two curved surfaces.

(iv) Is adaptable to the front or back end of a prime lens (i.e., mounts on the object-side or image-side of a prime lens), but does not otherwise require disassembly of the prime lens. For example, where the prime lens can be readily removed from a camera, the flare lens assembly of the present disclosure could be positioned between the prime lens and the sensor.

Examples

FIG. 1 is a lens diagram that shows an exemplary flare lens assembly 10, a lens attachment having three lens elements L1, L2, and L3 that are aligned along an optical axis OA. A prime lens 20 represents the lens system of the host camera or other imaging device, modeled as a paraxial, ideal, or "perfect" lens in the diagram shown and forming an image at an image plane P at a sensor 24. In practice, prime lens 20 could have a single lens or multiple lens elements, an aperture stop, and supporting mechanics; and is intended to form an image on sensor 24. Prime lens 20 has an optical axis OA. When attached, flare lens assembly 10 is configured to align its optical axis with optical axis OA of prime lens 20. Light crosses the optical axis through prime lens 20. Nominal field points from negative angles, with object heights in the −y direction from optical axis OA, are imaged to positive image heights, in the +y direction on sensor 24 of the camera.

For flare lens assembly 10 in FIG. 1, lens elements L1, L2, and L3 shown in FIG. 1 are spherical glass elements. In this example, each of the individual lens elements has optical power. The net power of lens assembly 10 in this example is very low, affecting the EFL of prime lens 20 by about 3%. Thus, for example, where the EFL of prime lens 20 is 4.130 mm, the addition of lens assembly 10 can effectively change the EFL of the combined system to 3.998 mm (−0.132 mm, or about 3%). In practice, both the prime lens and lens attachment can be readily scaled up or down, for larger or smaller format systems respectively. Likewise, as in all optical imaging designs in general, different trade-offs can be made between EFL change and size and image distortion/sharpness.

Figure 2:
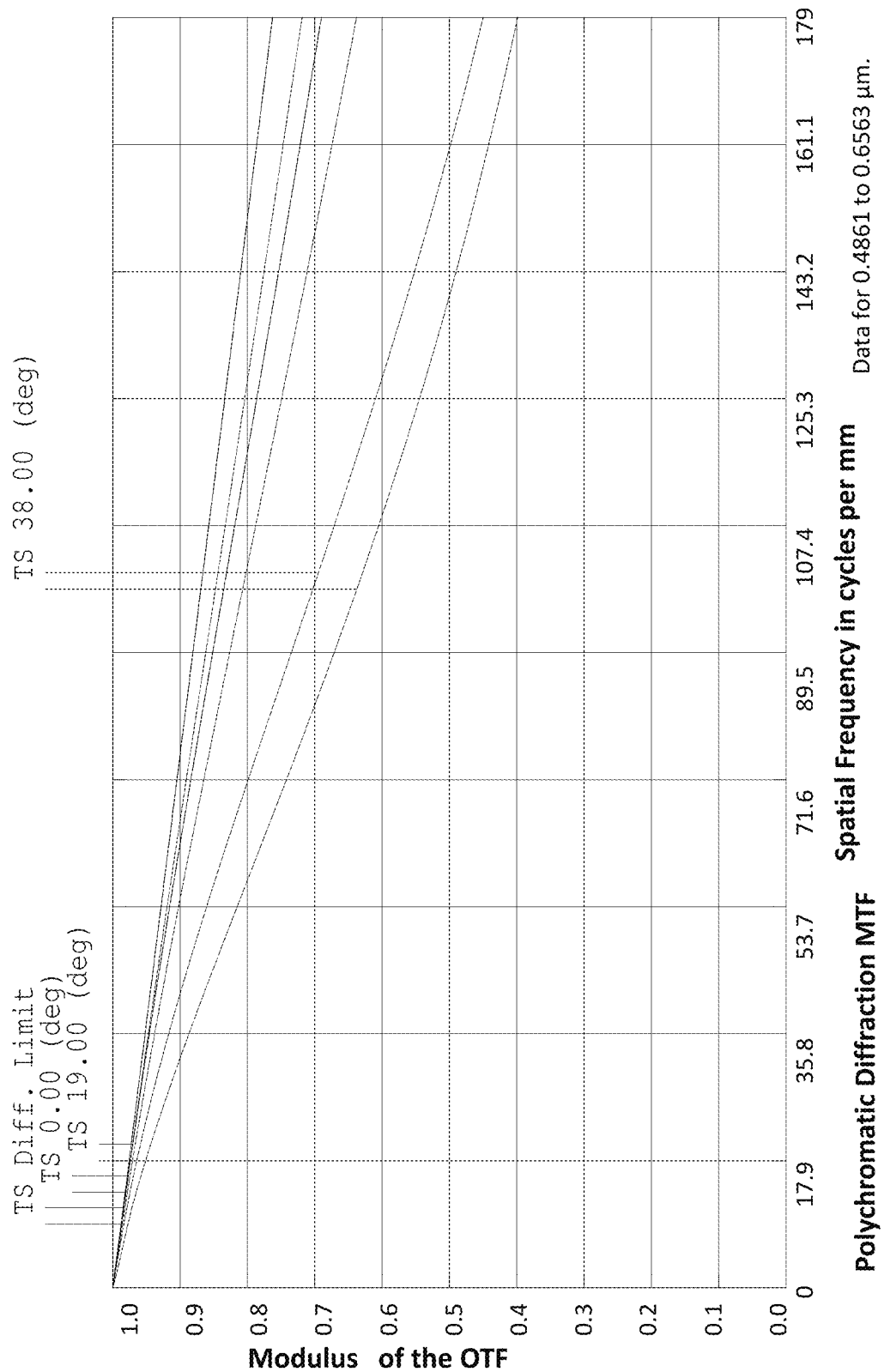
FIG. 2 is a chart that shows the polychromatic modulation transfer function (MTF) of flare lens attachment of FIG. 1 in combination with a perfect prime lens model.

FIG. 2 shows the polychromatic modulation transfer function (MTF) over the visible range of flare lens assembly 10 in combination with the prime lens 20. This shows that flare lens assembly 10 is essentially diffraction-limited over the majority of the field of view.

Figure 3:
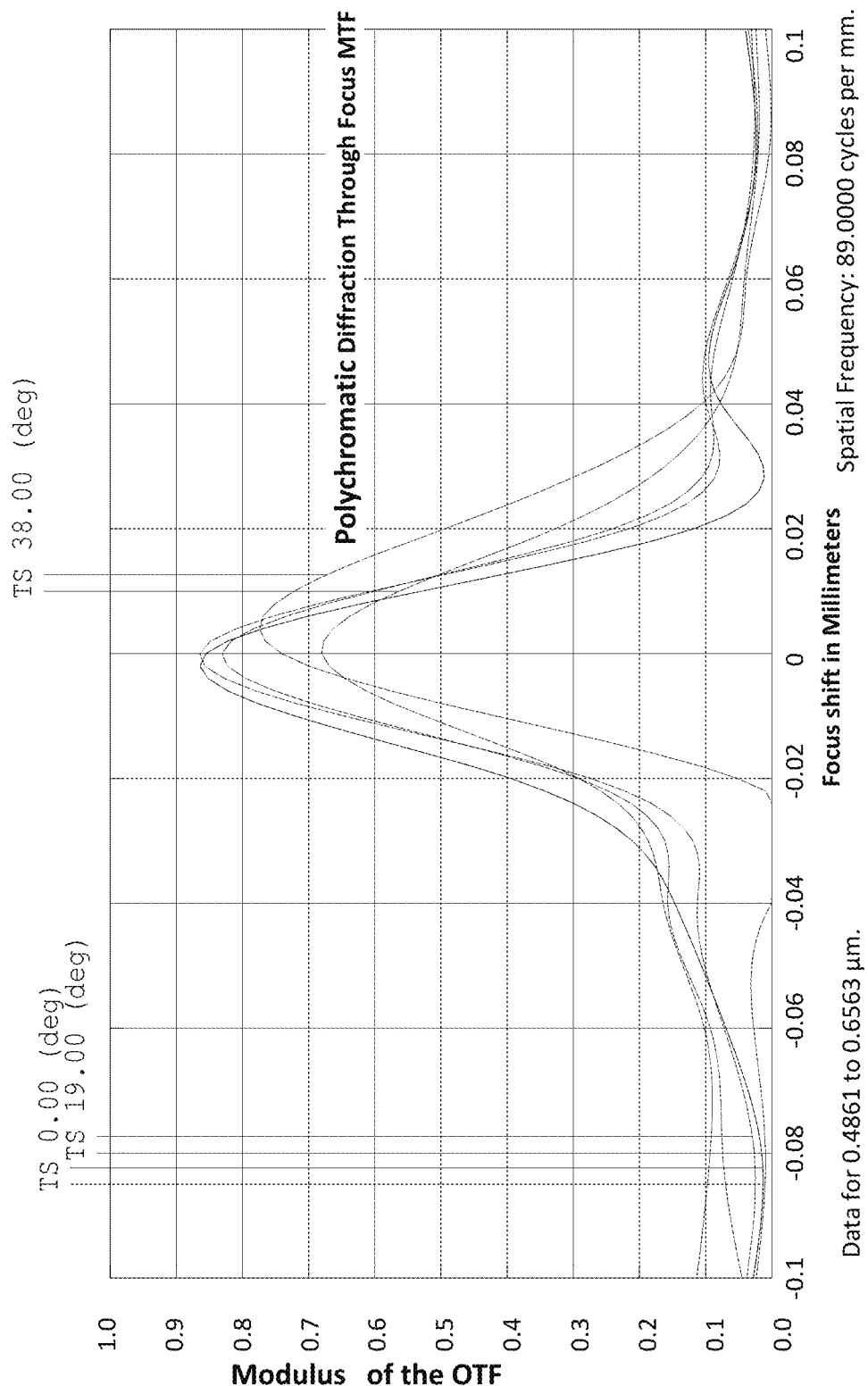
FIG. 3 is a chart showing polychromatic through-focus MTF at ¼ the Nyquist value (assuming 1.4 micron pixels) for the lens attachment of FIG. 1 in combination with a perfect prime lens model.

FIG. 3 shows the polychromatic through-focus MTF at ¼ the Nyquist value (assuming 1.4 micron pixels) for the lens assembly 10 of FIG. 1 in combination with the prime lens 20.

Figure 4:
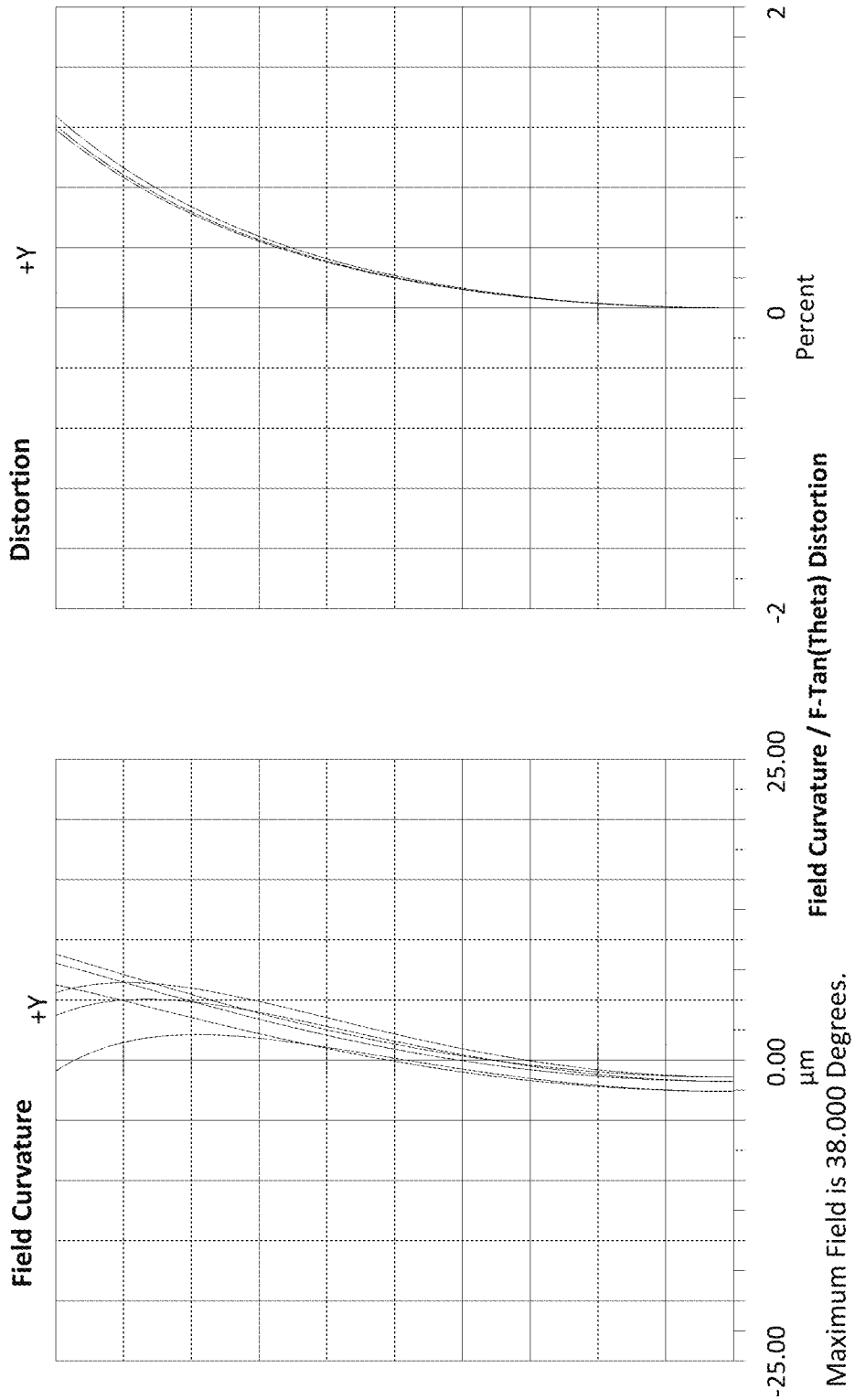
FIG. 4 is a graph that shows field curvature and distortion for the lens attachment of FIG. 1 in combination with a perfect prime lens model.

FIG. 4 shows field curvature and distortion for lens assembly 10 of FIG. 1 in combination with prime lens 20. Field curvature is very flat, as shown at a +/−25 um scale. Distortion for the FIG. 1 example is about 1.2%.

Figure 5B:
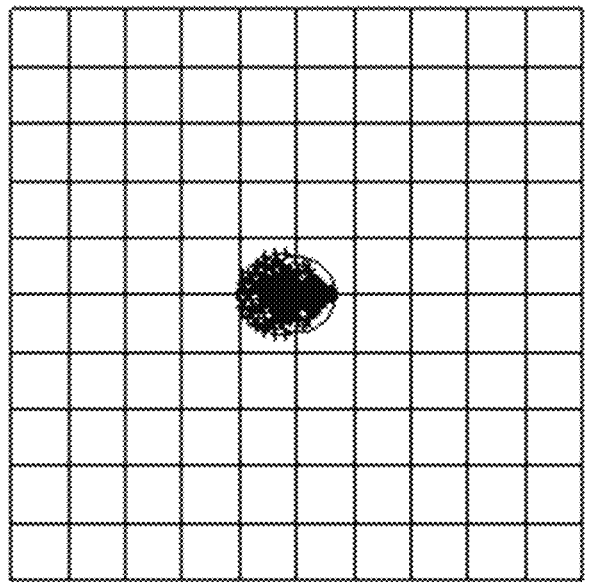
FIGS. 5A-5C are spot diagrams for the lens assembly design of FIG. 1 in combination with a perfect prime lens model, showing very good image quality.
Figure 5A:
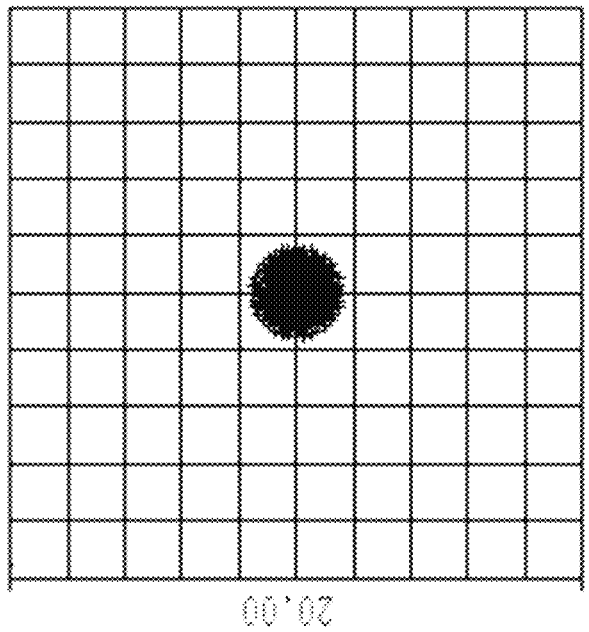
Figure 5C:
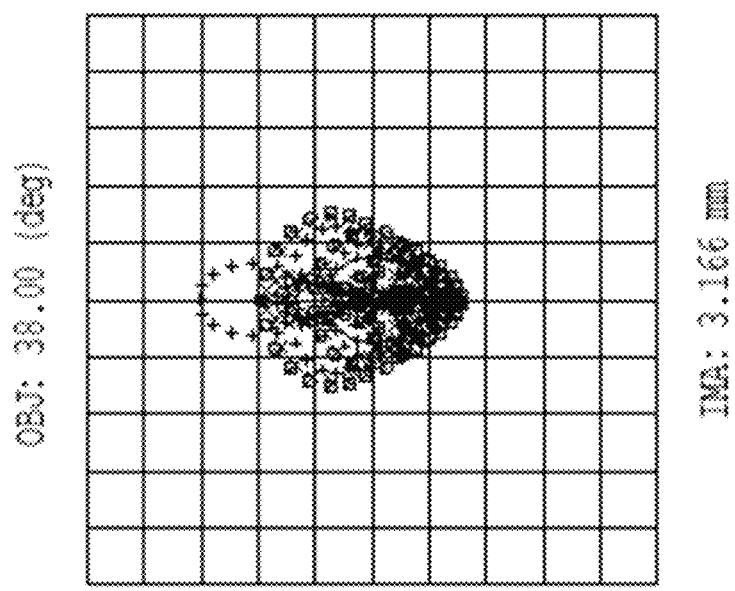

FIGS. 5A-5C are spot diagrams for the lens assembly 10 design of FIG. 1 in combination with prime lens 20, showing very good image quality. Pixel size is 1.4 um square. RMS spot radii range from about 0.6 um on-axis to 2.0 um in the extreme corner.

Figure 6:
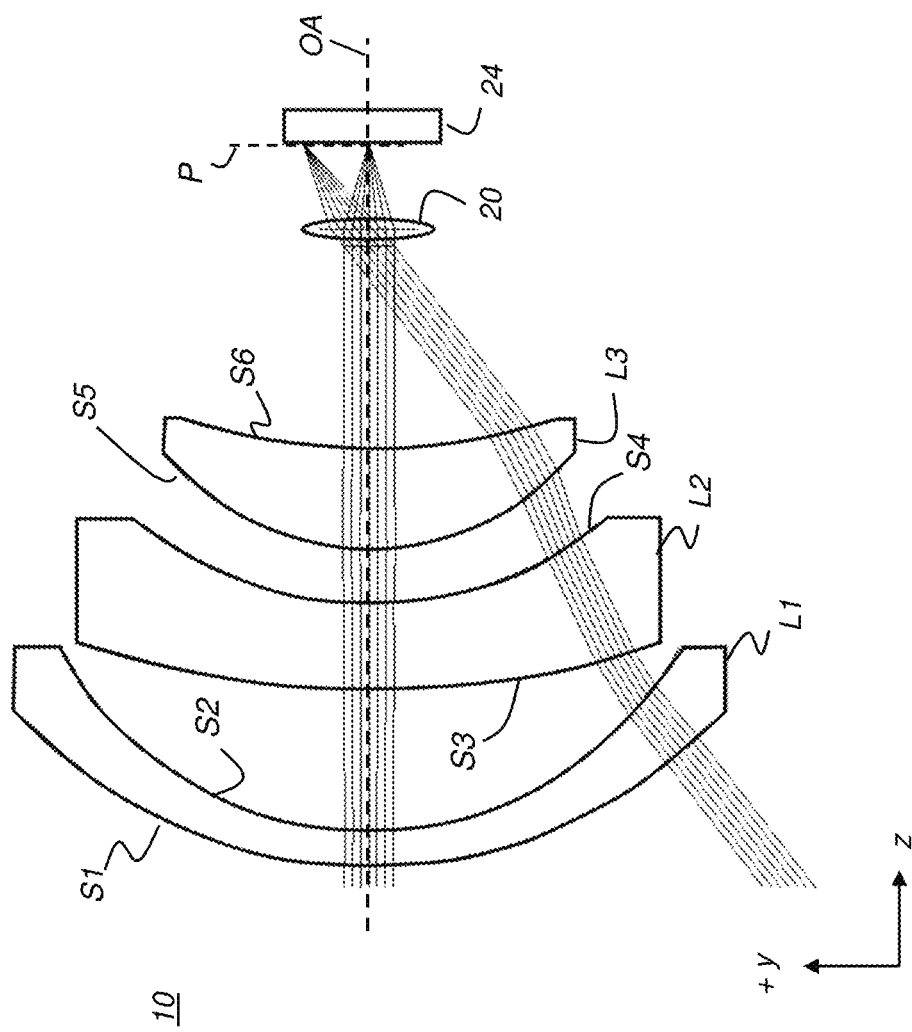
FIG. 6 shows the nominal imaging light path for light on-axis and from an off-axis point source for the flare lens attachment of FIG. 1.
Figure 7:
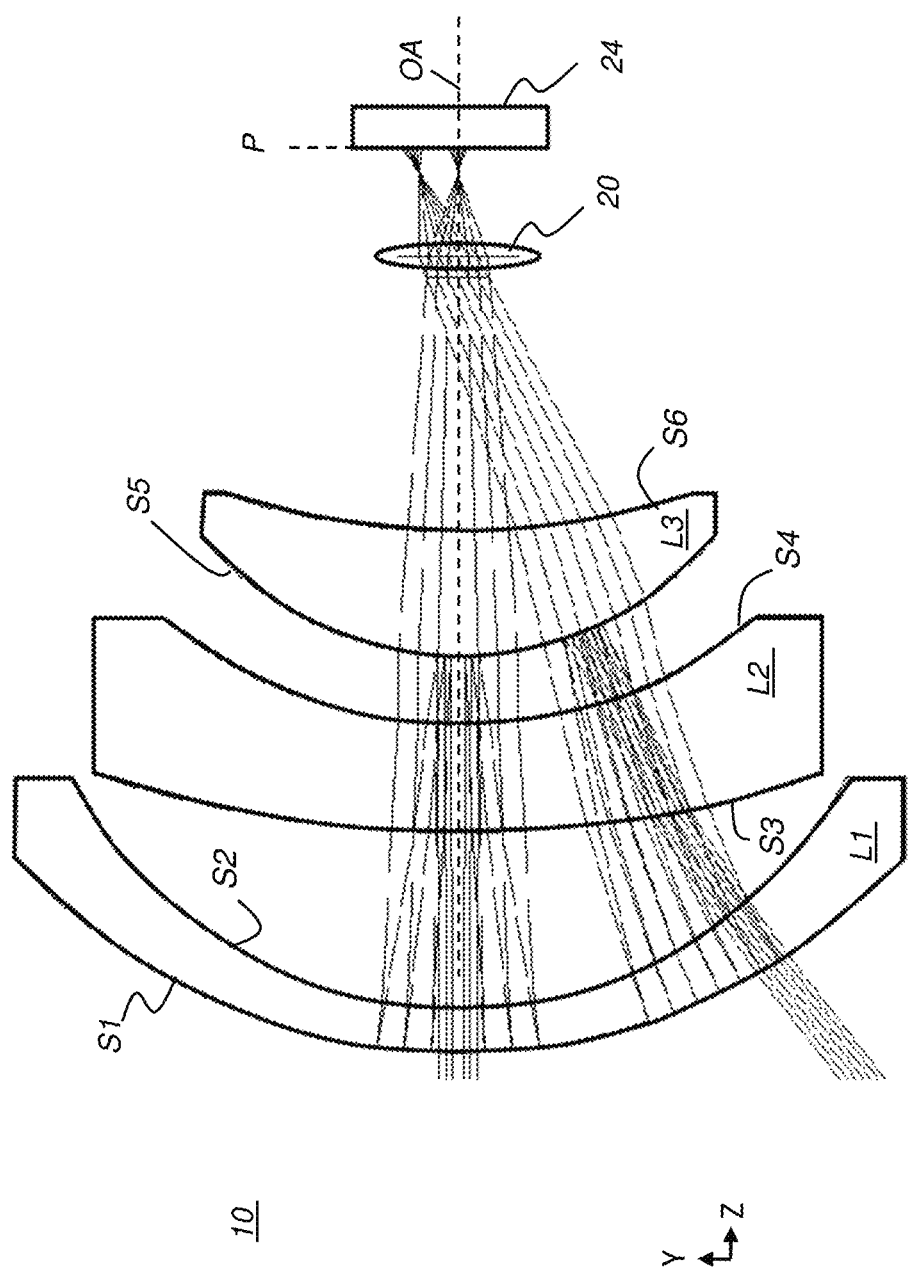
FIG. 7 shows an example two-bounce ghost image path from both on-axis and off-axis field points with the flare lens assembly embodiment of FIG. 1, with the ghost image from the off-axis source appearing at the sensor on the same side of the optical axis as the nominal image location for that field point.
Figure 8:
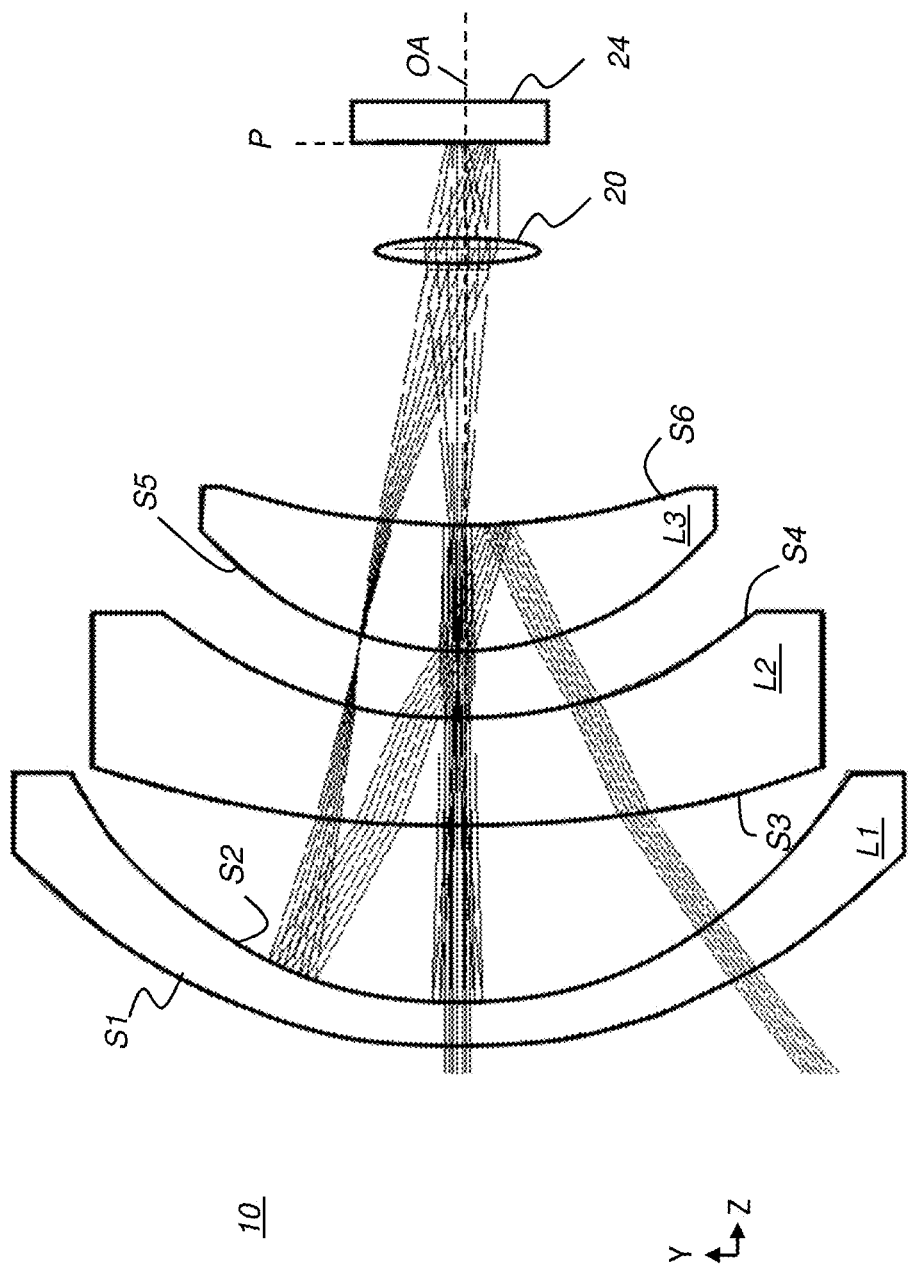
FIG. 8 shows a second example two-bounce ghost image path from both on-axis and off-axis field points with the flare lens assembly embodiment, with the ghost image from the off-axis source appearing at the sensor on the opposite side of the optical axis as the nominal image location for that field point.

By way of example, FIGS. 6, 7, and 8 show various light paths defined by flare lens assembly 10 of FIG. 1. FIG. 6 shows the nominal imaging light path that is defined by the FIG. 1 lens for light on-axis and for light from an off-axis point source through surfaces S1-S6 of the lens attachment. The light for forming the intended image, without added flare content, is transmitted through each of lenses L1, L2, and L3 and is focused at the imaging plane P of sensor 24.

Lenses and other optics in the imaging path, such as plates, are transmissive components, transmitting the majority of incident light that is received along the optical path. Lens surfaces that face each other along the optical axis, when conditioned to intentionally reflect or bounce a portion of the incident light to each other in the forward or reverse direction with respect to the optical axis, can provide the needed ghost image paths for generating ghost images such as flare in the detected image. The ghost image paths that are defined by the FIG. 1 lens attachment, flare lens assembly 10, can employ on-axis light as well as off-axis light. A point source, particularly for off-axis light, can optionally be used to enhance flare effects. The point source can be a bright light source or sunlight, for example.

According to an embodiment of the present disclosure, the optical attachment for imparting stray light to image content and thereby generating ghost images at the image plane, has at least two facing lens surfaces, each conditioned to have an intended amount of reflectance needed to define a ghost image light path, to the image sensor 24, for stray light. This conditioning can include providing a coating for one or both of the two facing lens surfaces.

FIG. 7 shows a ghost image light path that is defined for both on-axis and off-axis light by the flare lens assembly 10 embodiment of FIG. 1. The ghost image light path shown in FIG. 7 is a two-bounce light path; that is, there are two reflections of ghost image light from facing transmissive optical surfaces. For a portion of the incident light, reflection from surface S5 on lens L3, away from image plane P, and back towards the image plane P from surface S1 on lens L1, generates flare that can be sensed in the image content acquired at sensor 24. The ghost image thus formed by reflection from facing surfaces S5 and S1 is preferably somewhat out of focus as shown, converging just before or just after the nominal image plane P. The ghost image from the off-axis point appears on the same side of the optical axis OA as the nominal image for this point.

FIG. 8 shows another ghost image light path, again having two bounces (two reflections from facing transmissive surfaces), defined for both on-axis and off-axis light by the flare lens assembly 10 lens attachment embodiment of FIG. 1. For a portion of the incident light, reflection from surface S6 on lens L3, directing light away from the image plane P, and from surface S2 on lens L1, directing the light back toward image plane P, generates flare at sensor 24. The flare effect is again slightly out of focus, with a focal point past the nominal image plane P. For light from the off-axis point source shown in FIG. 8, the ghost image appears on the opposite side of the optical axis OA relative to the nominal image for this point source.

It should be noted that FIGS. 7 and 8 show only a subset of the ghost image light paths that are possible for the FIG. 1 lens arrangement of flare lens assembly 10. In general, for an n-surface optical attachment, the total number of defined ghost image light paths having 2 bounces is:

$$\frac{n!}{2!(n-2)!}$$

For a 3-element, 6-surface attachment as shown in FIGS. 1, 7, and 8, there are accordingly 15 possible double-bounce ghost paths. Moreover, numerous additional ghost image paths can be defined for multiple-bounce arrangements with more than two bounces.

Thus, a number of paths can be used for generating ghost light imaging and providing ghost images (flare effects) over the image of the FOV captured by the camera. There is also a continuum of angles within the field of view and outside the field of view where a light source can be located to potentially cause a ghost image. For simplicity, light from sources at only two field points are shown in FIGS. 7 and 8.

Reflectivity Range

As can be appreciated from the exemplary optical arrangement and light paths shown in FIGS. 7 and 8, redirection of stray light for ghost image formation requires that at least two surfaces of the flare lens assembly have sufficient reflectance over at least a portion of the visible spectrum. Considering the example of FIG. 7, this means sufficient reflection of surfaces S5 and S1. Using this example, the Applicants have identified a desirable range of reflectivity for the combined first and second facing surfaces of transmissive optical components that define the ghost image light path, averaged over the visible range from 450 to 650 nm, as follows:

$$R_{S5}*R_{S1} > 0.0001 \quad \text{(eq. 1)}$$

that is, the product obtained by multiplying the averaged reflectivity $R_{S5}$ of the first transmissive surface S5 that reflects the light backward from the prime lens 20, with the averaged reflectivity $R_{S1}$ of the second transmissive surface S1 that redirects this reflected light back toward prime lens 20 along the optical axis OA, exceeds 0.0001, alternately expressed as $(1\%)^2$ or $(0.01)^2$.

It must be emphasized that equation (1) above multiplies the two averaged values, over the visible range, from 450-650 nm. In a simple case, each of paired surfaces S5 and S1 has averaged reflectivity of about 1%. In a more complex case, S5 may have an average reflectivity of 4%; surface S1 would then require an average reflectivity of at least 0.25% in order for the S5-S1 pair of surfaces to provide a suitable light path for forming a suitably intense ghost image.

It is well known to those skilled in the imaging optics art that a lens having reflectivity of more than about 0.5% would be considered an inferior design, unacceptable for use as part of a prime lens for any type of integrated imaging system.

Typical anti-reflective (AR) coatings used for any optical surfaces in an imaging optical apparatus allow reflectivity of less than about 0.5% (0.005), with typical values for reflectivity well below 0.5%, such as in the range of 0.3% (0.003) or less for high performance systems. Thus, the multiplicative product, or simply, the product of reflectivity values for any two facing optical surfaces in conventional imaging lens designs, such as in any prime lens design, is typically much less than $(0.5\%)^2$ or 0.000025. This means that the two reflective surfaces employed in combination for imparting stray light into the imaging path in embodiments of the present invention require, at a minimum, at least 4 times the product of reflectivity of two facing surfaces that have been appropriately conditioned to reduce reflection in conventional lens designs.

As a practical maximum, the product of reflectivity values for two facing surfaces generally does not exceed a value of $(10\%)^2$, that is, $(0.1)^2=0.01$. Excessive reflectivity would seriously compromise image quality.

Intensity Comparison

Comparison of the relative level of the ghost image light with the true image content obtained from the object, through prime lens 20 and its associated flare lens assembly can be shown in considering the paths of light, for example, in FIG. 7.

The path for image-forming light conveyed from the FOV to sensor 24 for acquiring the intended image is a factor of the light obtained from the object scene and the product of transmissive percentage values $T_{Sn}$ associated with each of n lens surface and transmissive percentage values $T_{Ek}$ associated with each of k lens elements or optics exclusive of surface reflections (i.e., due to bulk material absorption), where k represents element number. In the case of FIG. 7, this transmission product is computed as follows:

$(T_{S1}*T_{S2}*T_{S3}*T_{S4}*T_{S5}*T_{S6})*(T_{E1}*T_{E2}*T_{E3})$=factor for image-forming light (eq. 2)

In contrast, the light path for stray light that generates ghost images shown in FIG. 7 has a transmission product computed as follows:

$(T_{S1}*T_{S2}*T_{S3}*T_{S4}*R_{S5}*T_{S4}*T_{S3}*T_{S2}*R_{S1}*T_{S2}*T_{S3}*T_{S4}*T_{S5}*T_{S6})*(T_{E1}*T_{E2}*T_{E2}*T_{E1}*T_{E1}*T_{E2}*T_{E3})$=factor for ghost-image-forming light (eq. 3)

In terms of light transmission, the throughput of the light path for forming the ghost image is constrained by the reflectance factors, the low percentage values given as $R_{S1}$ and $R_{S5}$ in the equation (3) example. Thus, it can be seen that the ghost image content can have only a very small fraction of the light used for forming the image on the sensor 24. With respect to the proportion of stray light resulting from surfaces S1 and S5, the actual ghost image-light that is acquired by sensor 24 depends on the amount of light both inside and outside the FOV, the above factor of equation (3), and any mechanical structures in the optical system that may block light passage for stray light paths. It should also be noted that the relative brightness of a ghost image compared to a nominal image is affected by the relative scale or size of the ghost image, which is often different than that of the nominal image. It should also be noted that ghost light can come from outside the nominal FOV. In the case of a bright source, such as the sun positioned just outside the FOV, this can significantly affect the relative brightness of the ghost image within a captured scene.

Figure 9:
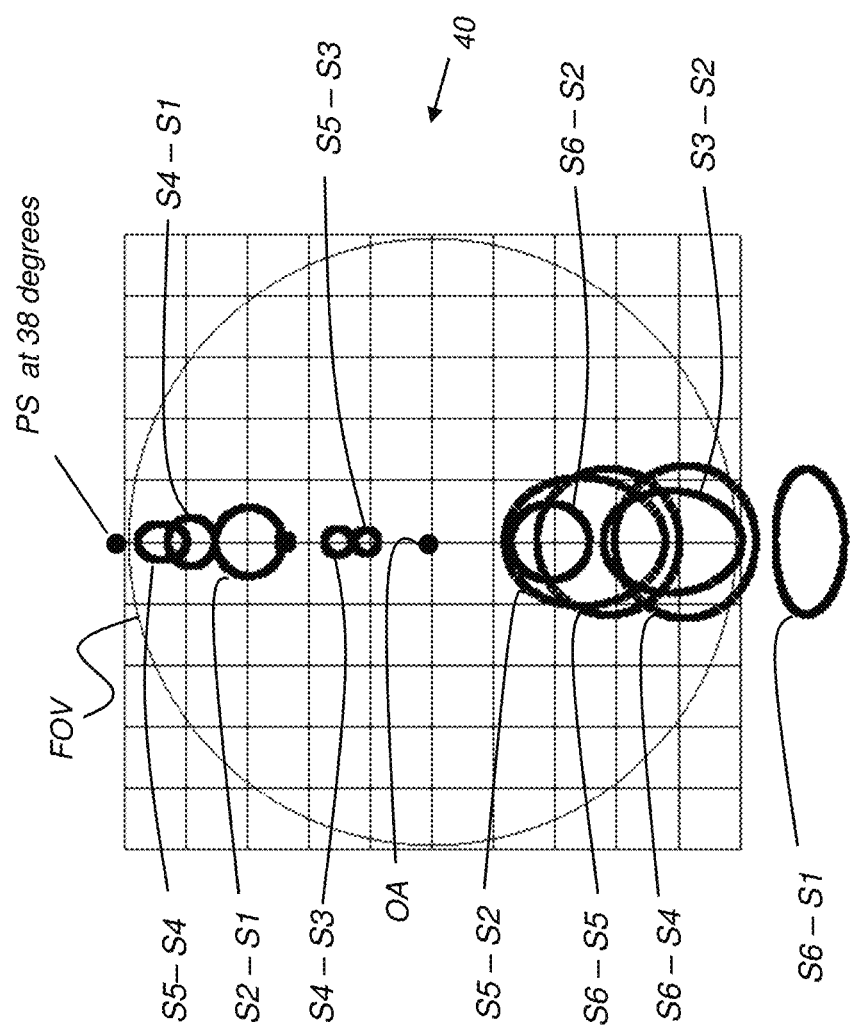
FIGS. 9, 10, and 11 show, in schematic form, examples of the resulting ghost images that appear for different positions of a point source for the flare lens attachment of FIG. 1.
Figure 10:
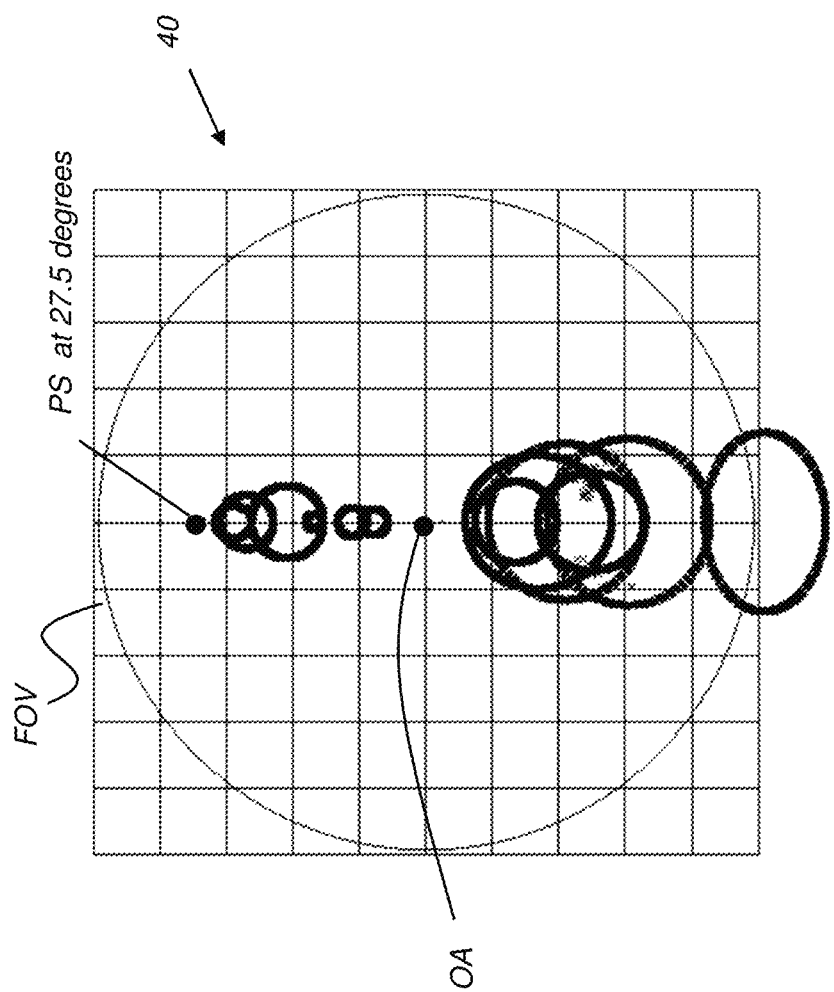
Figure 11:
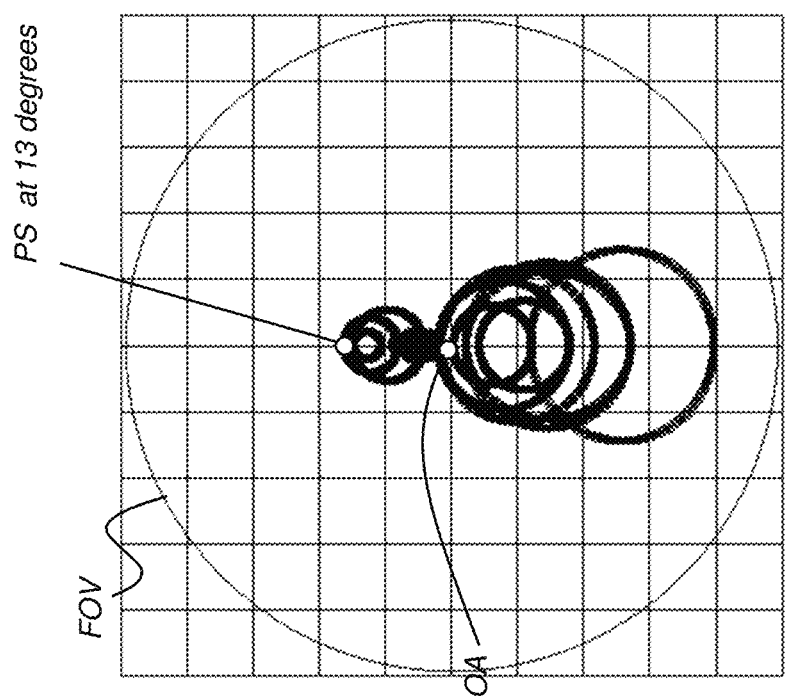

It should further be noted that there can be multiple paths for ghost image light within flare lens assembly 10, with the paired surfaces having different reflectance values and imaging characteristics. FIGS. 9, 10, and 11 show, in schematic form, examples of locations for mapping some of the resulting ghost images 40 that can be generated by flare lens assembly 10 of FIG. 1, and FIGS. 6-8.

FIG. 9 shows an arrangement of double-bounce ghost images 40 resulting from some of the 15 possible double-bounce paths for point source PS at 38 degrees from the optical axis OA. For a number of the individual ghost images 40 shown in FIG. 9, the contributing paired surfaces are identified. For example, the top ghost image 40 is formed from stray light reflected between surfaces S5 and S4. The bottom ghost image 40 is formed from stray light reflected between surfaces S6 and S1. A cluster of images 40 are formed from stray light reflected between surface S6 paired with surfaces S2, S4, S5, respectively. From this mapping, it can be seen that various measures can be taken to control the position of ghost images as well as to accentuate or attenuate ghost image formation, such as by increasing or decreasing lens surface reflectance using different coatings, for example. The dependency of incident angle of light from the point source PS is also a factor that can be controlled in ghost image formation using embodiments of the present disclosure.

FIG. 10 shows a mapping of ghost images 40 similar to that shown in FIG. 9 and derived from the same set of paired surfaces, where point source PS is 27.5 degrees from optical axis OA. FIG. 11 shows ghost images 40 where point source PS is 13 degrees from optical axis OA.

Figure 12:
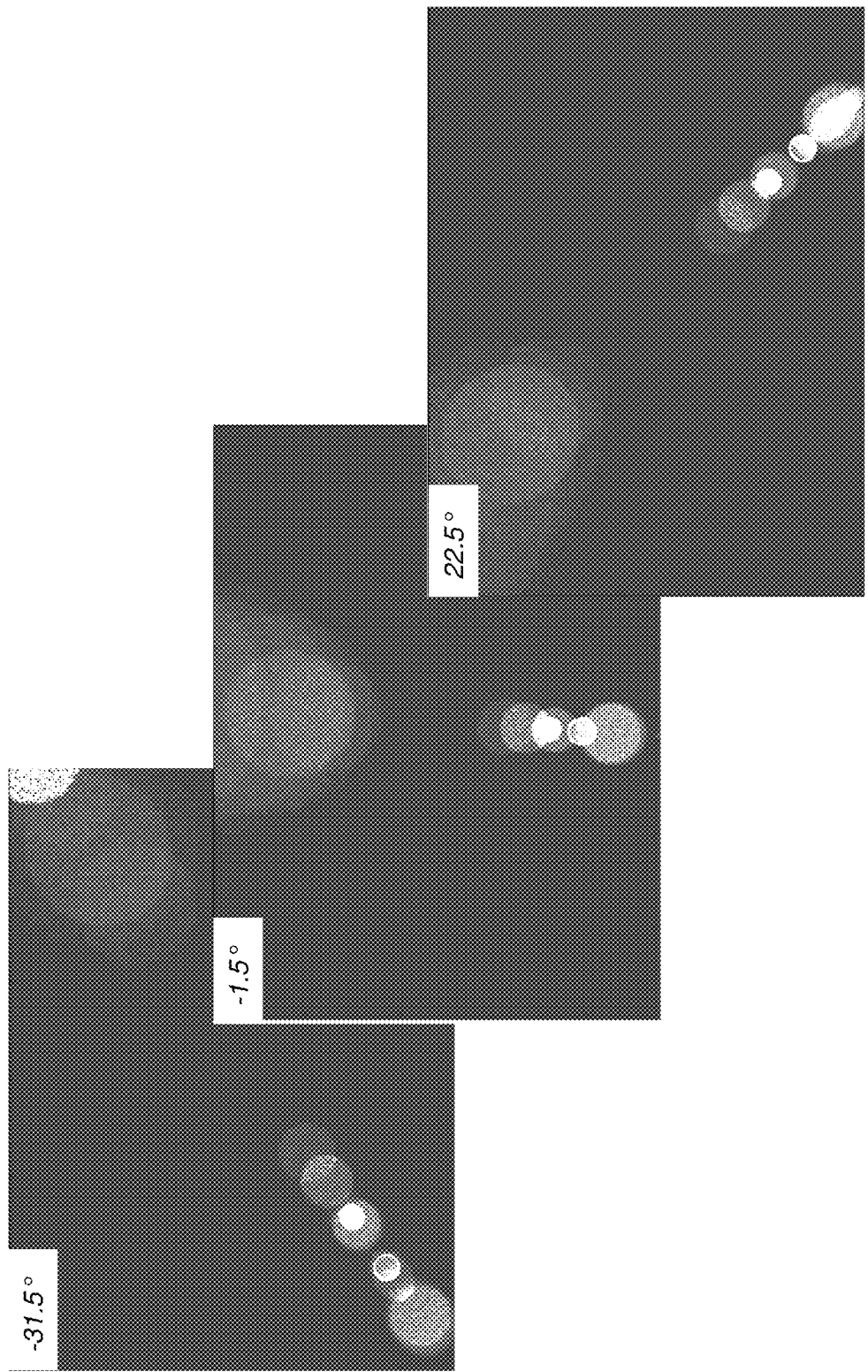
FIG. 12 shows a progression of ghost images that appear for different positions of a point source positioned just outside the field of view of the prime lens according to an embodiment of the flare lens assembly of the present disclosure.

FIG. 12 shows a progression of image frames showing ghost images 40 that appear for different positions of a point source PS positioned just outside the field of view FOV of prime lens 20, according to an alternate embodiment of the flare lens assembly of the present disclosure. For this set of image frames, proceeding from left top to lower right, the point source is moving from left to right with respect to the imaging host camera, just below the frame of the image, with exemplary horizontal field angles of −31.5 degrees, −1.5 degrees, and 22.5 degrees.

Forming Images with Flare Effects

For the optical system of a camera or other device, an image frame is formed on the sensor 24 or on film at the focal plane P. The prime lens 20 defines a refractive geometry that maps object points in the field of view (FOV) to image points or pixels on the image sensor (or film) at the focus plane P. This is the function of prime lens 20 whether or not the flare lens assembly is attached.

The flare lens assembly of the present disclosure, as a lens attachment to the camera device, defines, for the same optical axis OA and field of view, an additional mapping that is provided to the prime lens 20. To generate this mapping, the flare lens assembly directs light conveyed from the FOV (or directed from outside the FOV) that has been reflected from internal surfaces within the flare lens assembly to the prime lens 20 for combination with the image point mapping of the optical system.

In general, the ghost images 40 that are formed in this combination are out of focus, as evidenced by spot growth of at least 2×, often as much as 4× or greater, for example. The ghost images may be the same size or different size compared to the nominal image, as they are the result of different light paths within the system, versus the nominal image path. Ghost images can be clearly visible and, in some cases, can even obstruct or interfere with FOV visibility within the image area.

From an imaging aspect, the prime lens and sensor of the optical system can thus obtain both of the following from the same object point or feature:
  (a) actual image content transmitted along the imaging path of the flare lens assembly without reflection from lens surfaces and captured at a first sensor frame location or pixel; and
  (b) "ghost" image content or flare, conveyed through the flare lens assembly but reflected from two or more paired lens surfaces and captured at a second frame location or pixel, distinct from and spaced apart from the first sensor frame location or pixel.

Figure 13:
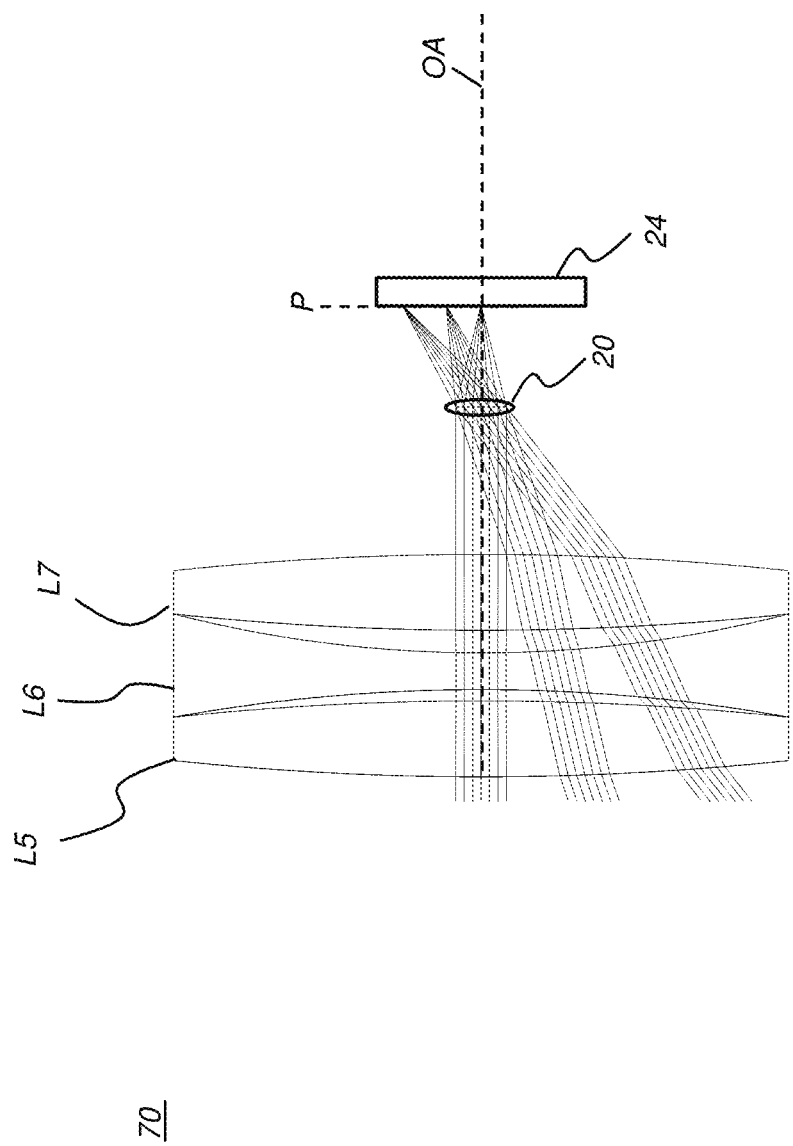
FIG. 13 is a side view of a lens attachment for imparting flare according to an alternate embodiment, showing the nominal imaging path.

The side view of FIG. 13 shows a nominal image path defined by a flare lens assembly 70 according to an alternate embodiment of the present disclosure. In flare lens assembly 70, lenses L5 and L7 can have identical curvatures. Again, as with the optical assembly of FIG. 1, the complete flare lens assembly 70 of FIG. 13 provides a lens attachment that has substantially zero optical power.

Figure 14:
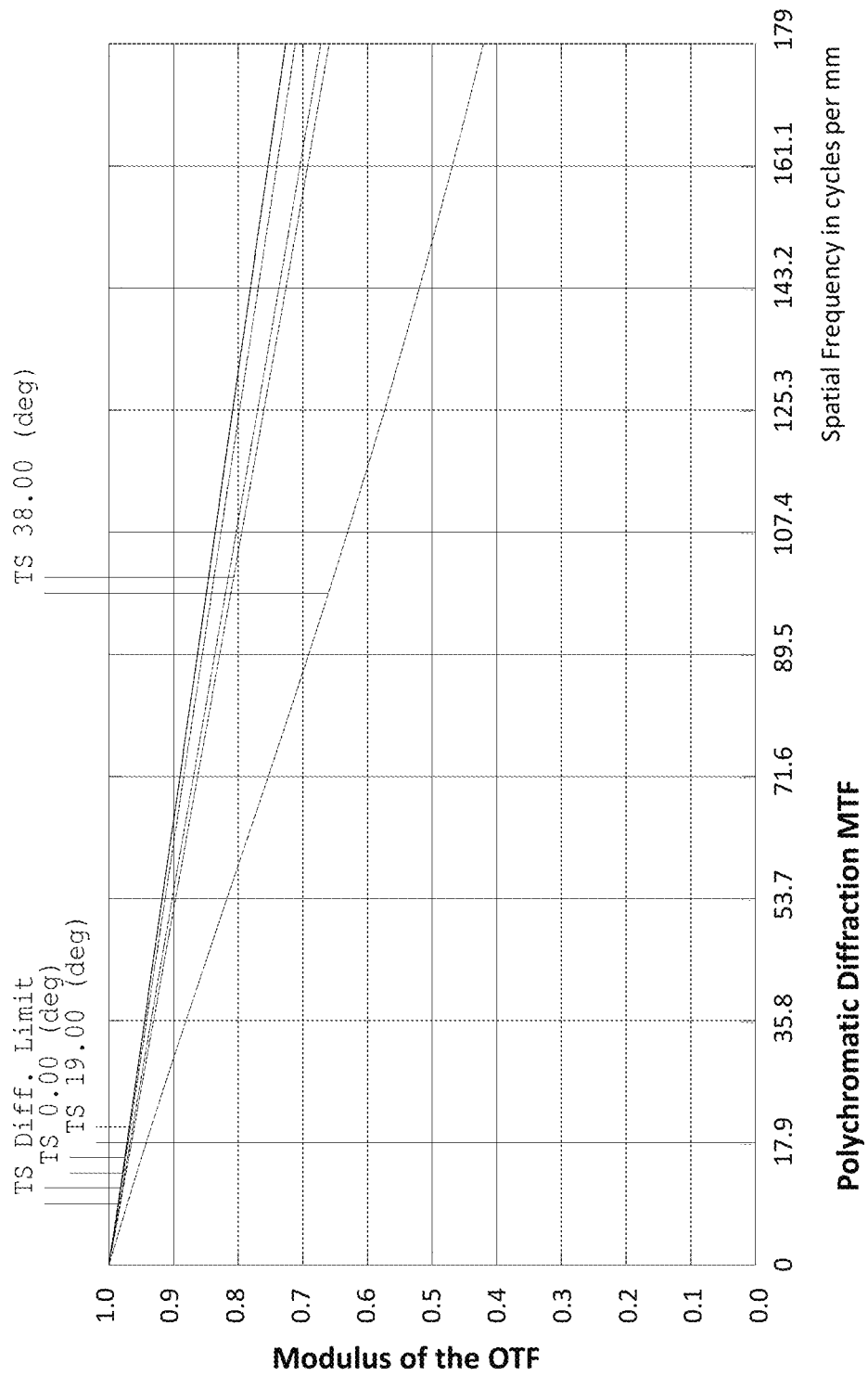
FIG. 14 is a chart that shows the modulation transfer function (MTF) of flare lens attachment of FIG. 13 in combination with a perfect prime lens model.

FIG. 14 shows the polychromatic modulation transfer function (MTF) of flare lens assembly 70 in combination with an ideal prime lens 20 at the half-Nyquist value. This shows that lens assembly 70 is essentially diffraction-limited over the majority of the field of view. This lens assembly also has low distortion and field curvature.

Figure 15:
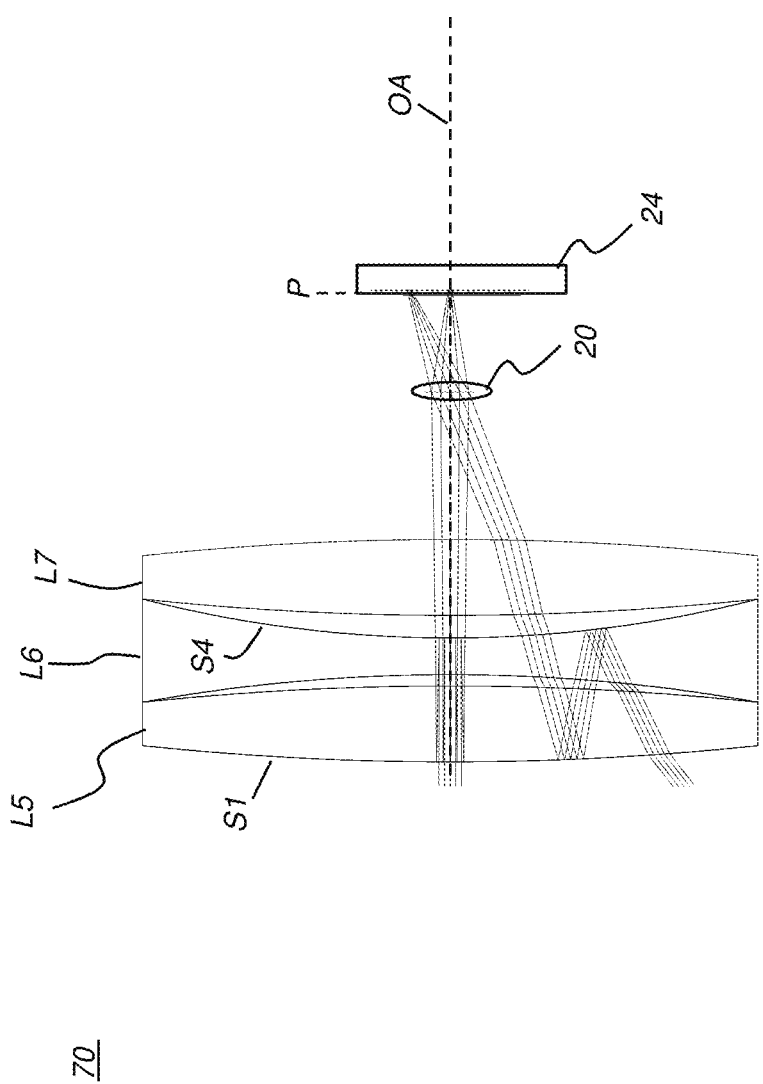
FIG. 15 shows an example ghost image path for light on-axis and from an off-axis point source for the flare lens attachment of FIG. 13.

FIG. 15 shows light paths defined for ghosting or flare from both on-axis and off-axis light by the flare lens assembly 70 embodiment of FIG. 13. For a portion of the incident light, reflection from surface S4 on lens L6 and from surface S1 on lens L5 generates flare that in the acquired image at sensor 24. The ghost image is, preferably, just slightly out of focus as shown, converging just before or just after the nominal image plane P of prime lens 20. In this example, flare from the off-axis point source is on the same side of the optical axis OA as the nominal image point that is shown.

Figure 16:
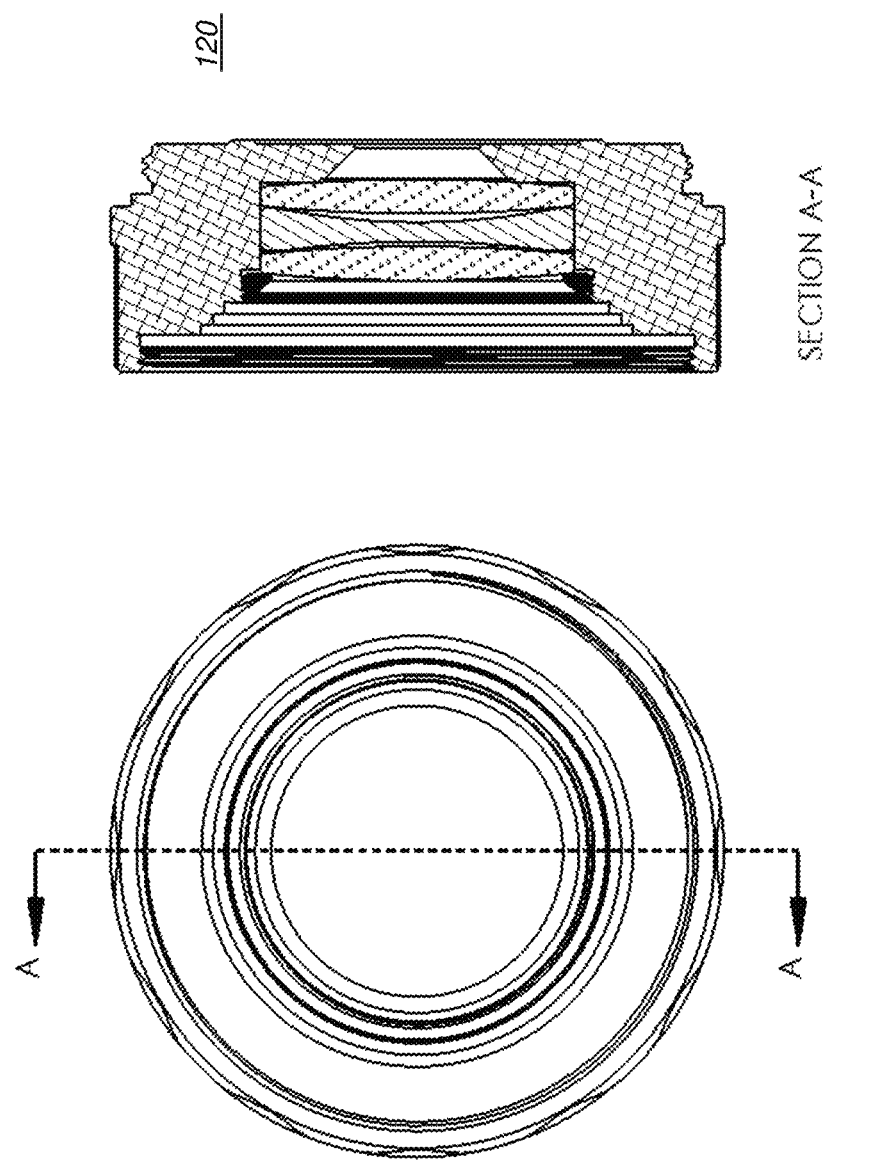
FIG. 16 shows a lens attachment for the optical embodiment shown in FIG. 13.

The lens attachment of the present disclosure can be packaged and mounted using conventional methods, based on size and configuration of the host camera. FIG. 16 shows one arrangement of a lens attachment 120 for flare lens assembly 70 use with a conventional camera. Lens attachment 120 aligns the optical axis of the flare lens assembly with the optical axis OA of the prime lens of the camera.

Figure 17:
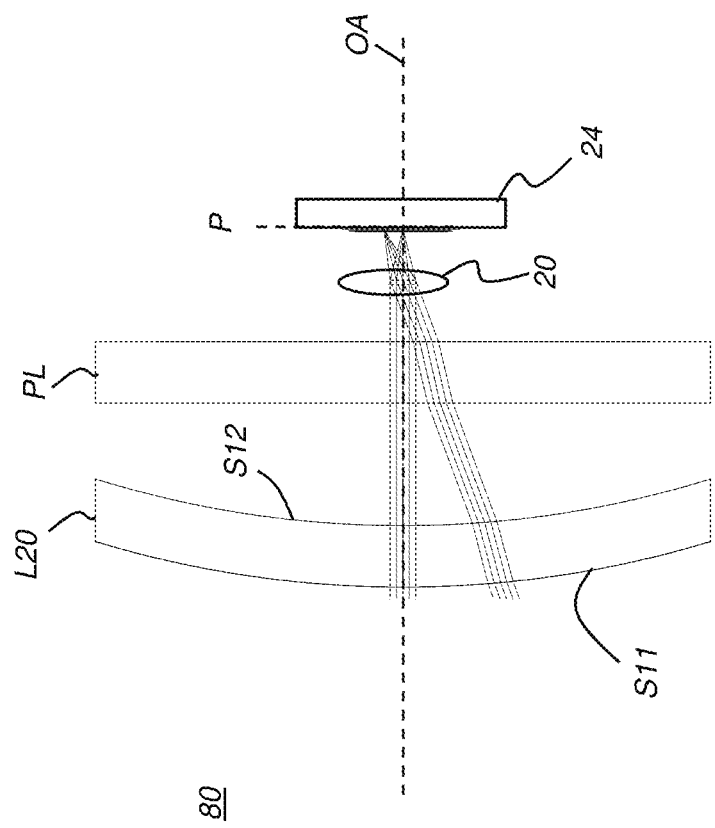
FIG. 17 is a side view of a lens attachment for imparting flare according to an alternate embodiment, showing the nominal imaging path.

FIG. 17 shows a side view and primary imaging path for another embodiment of a flare lens assembly 80. Flare lens assembly 80 has a meniscus lens L20 with curved surfaces S11 and S12 and a plano plate PL.

Figure 18:
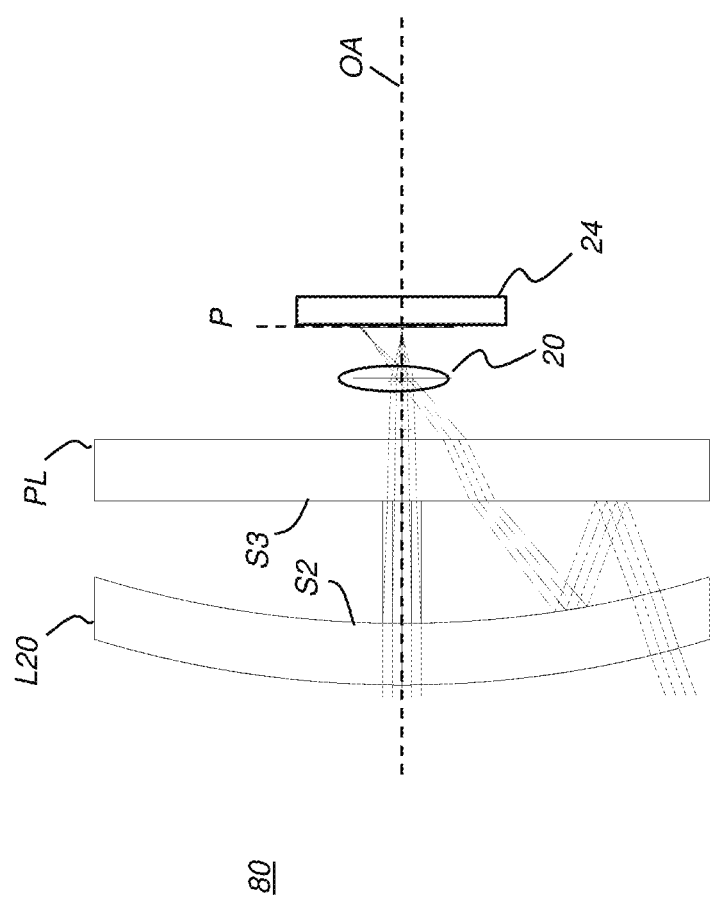
FIG. 18 shows an example ghost image path for light on-axis and from an off-axis point source for the flare lens attachment of FIG. 17.

FIG. 18 shows light paths defined for ghosting or flare from both on-axis and off-axis light by the flare lens assembly 80 embodiment of FIG. 17. For a portion of the incident light, reflection away from image plane P from surface S3 on plano plate PL and back toward image plane P from curved surface S2 on lens L20 generates flare that can be sensed at sensor 24. The ghost image is, preferably, just slightly out of focus as shown, converging just before or just after the nominal image plane P. Flare from the off-axis point source can be on the same or on the opposite side of the optical axis OA as the nominal image point.

Lens assembly designs that meet the requirements (i)-(iv) outlined above can be developed and analyzed using conventional lens design software, such as commercial optics software packages known to those skilled in the optical design arts. In some cases, conventional anti-reflection coatings are eliminated or replaced with coatings that provide some measure of reflection at lens surfaces.

Coatings and Lens Treatments

Surfaces of lens elements and other transmissive optics of the flare lens assembly can be conditioned using various types of coatings to create differently colored ghost images or flares. Surface coating characteristics can be designed to affect ghost image features such as intensity and spectral content, such as by suppressing or enhancing reflection at specific wavelengths. The edges of lenses or plano plate features can be left un-blackened to define additional flare light paths. In addition, portions of the mechanical structures between lenses, such as mounting brackets and the like, can be coated or otherwise treated to be made shiny or highly reflective or with diffractive features to define additional flare light paths.

Excessive flare intensity can result under some conditions and may not be desirable. Because the source of ghost images can be traced to individual lens surfaces, as shown in the example of FIG. 9, embodiments of the present disclosure allow the designer to attenuate flare by conditioning one or more lens surfaces with appropriate coatings or other treatments.

One problem with changing surface reflectivity to modulate flare intensity to reduce a particularly excessive ghost image is unwanted attenuation of other subtle flare effects. This problem, as well as color shift preferences, can be addressed using wavelength-dependent coatings.

Figure 19:
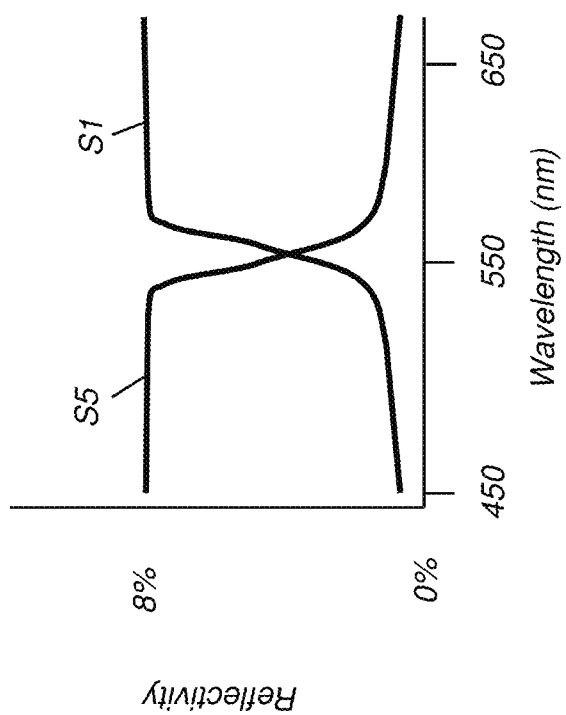
FIG. 19 is a graph showing a reflective coating characteristic for forming a type of notch filter for intensity modulation.

By way of example, the graph of FIG. 19 shows one possible configuration showing simplified characteristic curves for thin film coatings that can be suitable for the optical path for stray light shown in FIG. 7. This arrangement would effectively reduce the stray light component from this surface pair, compared against uncoated low-index surfaces with ~4% reflectance across the 450-650 nm range, without adverse effect to the stray light level for other surface combinations, including those which pair with either S1 or S5—for example, an S2-S1 pair. This does affect the spectral content of this S2-S1 pair, but can be made to have no perceptible effect on the overall level. Surface S5 of lens L3 would be highly reflective to light from 450 to near 500 nm, dropping significantly for light at 550 nm and longer wavelengths. Cooperating surface S1 would exhibit low reflectance to light below 550 nm, with higher reflectivity for light of longer wavelengths. This arrangement would provide a mechanism to selectively suppress ghost image level from one surface pair without highly compromising ghost image level from other surface pairs which may already be more subtle.

Figure 20:
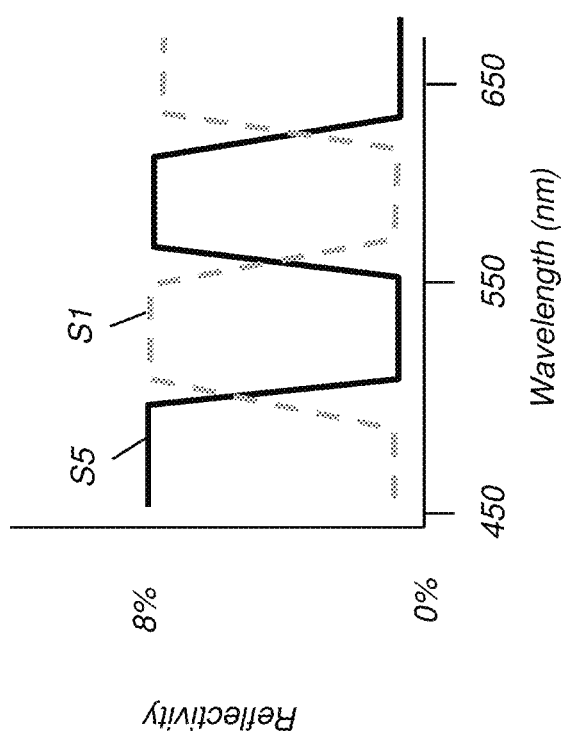
FIG. 20 is a graph showing a reflective coating characteristic for modulating flare intensity without noticeable compromise to color for flare content.

Another example using spectral filtering for intensity modulation is shown in the simplified graph of FIG. 20. Here, portions of the stray light are selectively attenuated without perceptible loss of overall color content. Still other arrangements can be envisioned, with attenuation of particular colors to achieve different flare effects.

Figure 22:
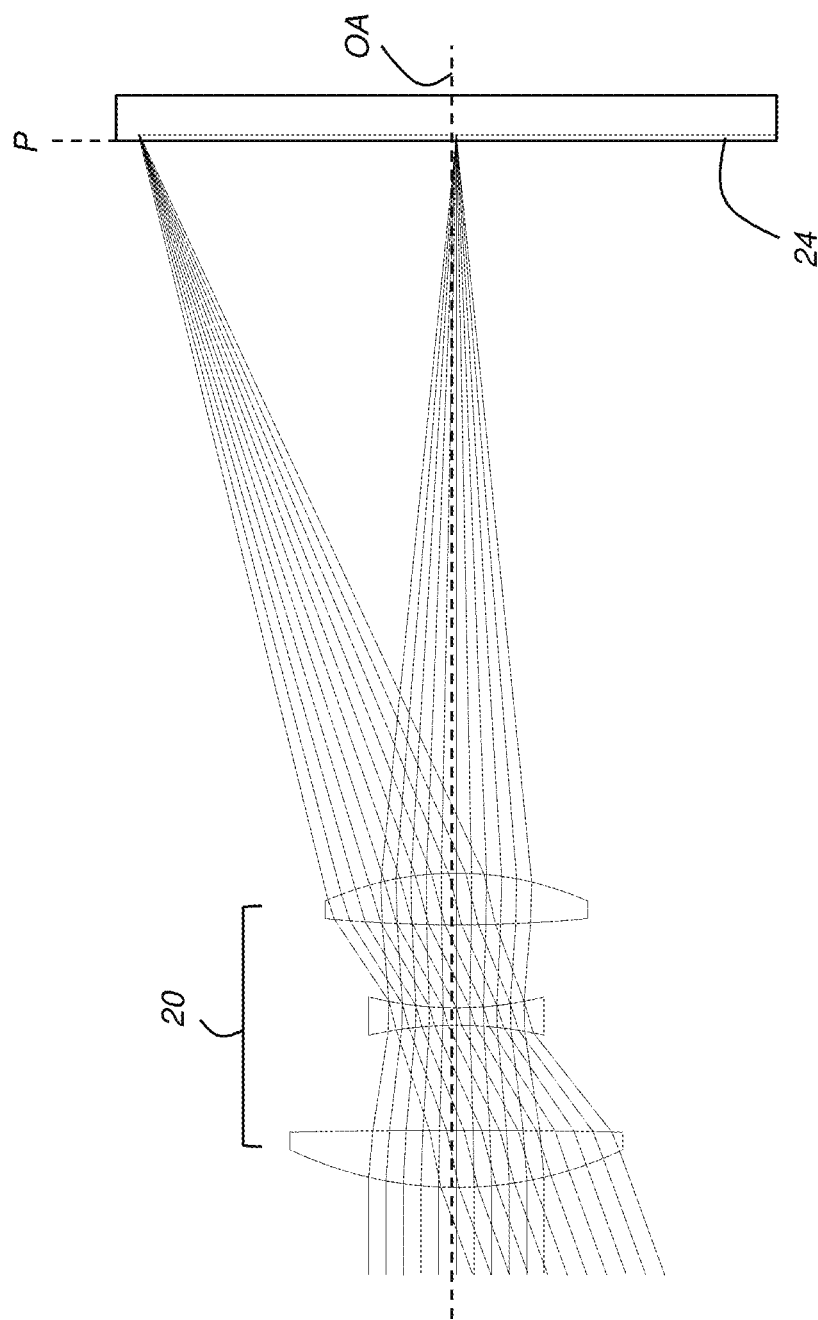
FIG. 22 shows an imaging path for a prime lens that forms an image at an image plane of a camera.
Figure 23:
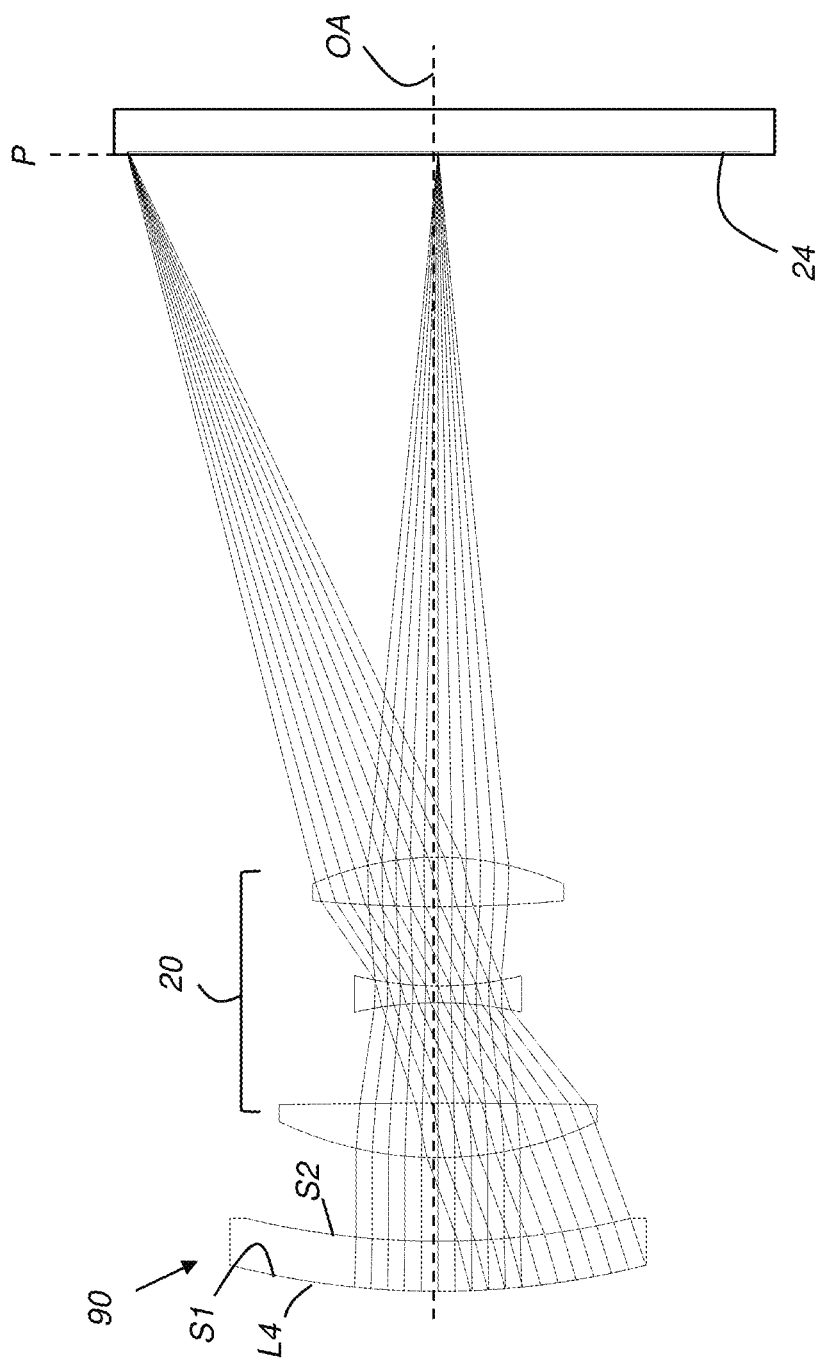
FIG. 23 shows the addition of a flare lens assembly along the optical axis of the prime lens of FIG. 22.

According to an alternate embodiment, a removable camera lens attachment can be a flare lens assembly having a single transmissive optical element configured for alignment along an optical axis of a prime lens that defines the image plane of a camera. FIG. 22 shows an imaging path for a prime lens that forms an image at an image plane of a camera. FIG. 23 shows the imaging path with the addition of a lens attachment, flare lens assembly 90, having a single transmissive optic, a meniscus lens L4. The change to EFL for prime lens 20 is in the range of about 2%. A plano plate could alternately be employed for this purpose. The at least one transmissive optic has at least one partially reflective surface S2 that is conditioned to redirect stray light that has been reflected away from the image plane P back toward the image plane P as a ghost image. According to an embodiment of the present disclosure, a reflectance range of at least 8% is provided to surface S2 by conditioning surface S2 with a coating. With this high level of reflectance, even very low reflectance from prime lens 20 surfaces, such as 0.125% can be sufficient to define a stray light or ghost image path with the desired multiplicative product of reflectance, as described previously.

Figure 24:
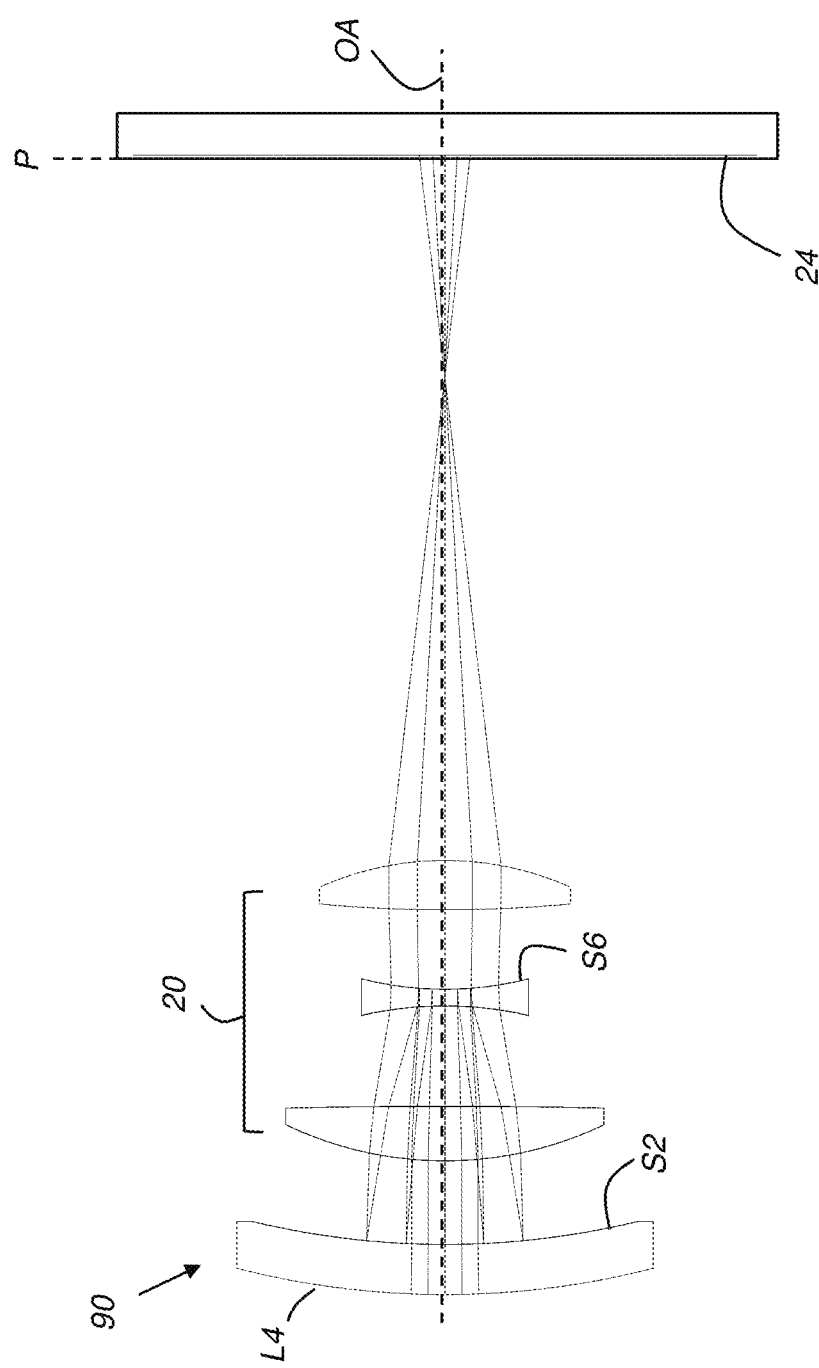
FIG. 24 shows generation of an on-axis ghost image using the flare lens assembly of FIG. 23.

FIG. 24 shows generation of an on-axis ghost image using the flare lens assembly 90 of FIG. 23. The ghost image light path is shown for reflection between surface S2 of flare lens assembly 90 and a prime lens surface S6, the fourth surface from the objective of prime lens 20.

Figure 25:
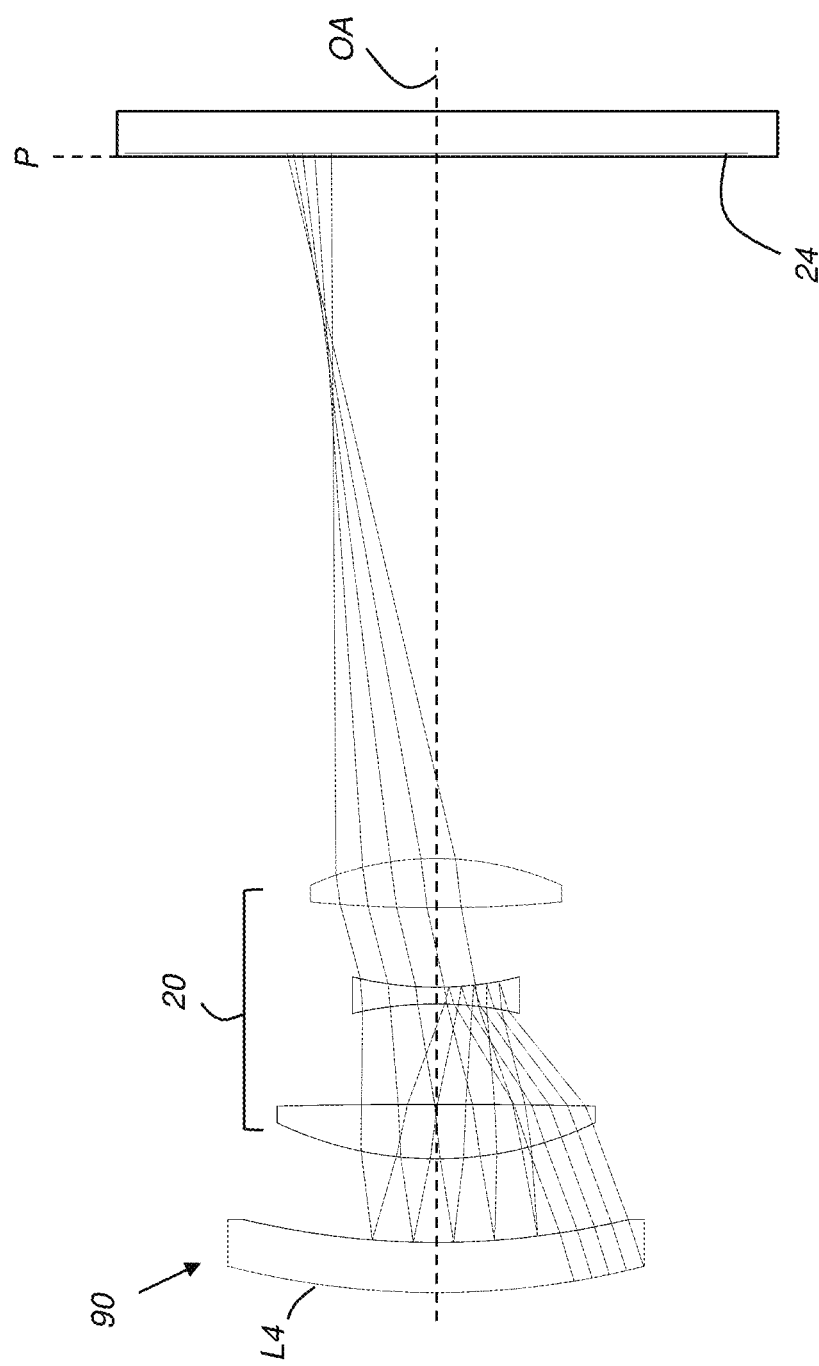
FIG. 25 shows generation of an off-axis ghost image using the flare lens assembly of FIG. 23.

FIG. 25 shows generation of an off-axis ghost image using the flare lens assembly 90 of FIG. 23, with reflection of stray light away from, and back toward image plane P along the ghost image light path that is defined between surface S2 of flare assembly 90 and prime lens surface S6, the fourth surface from the objective of prime lens 20.

Figure 26:
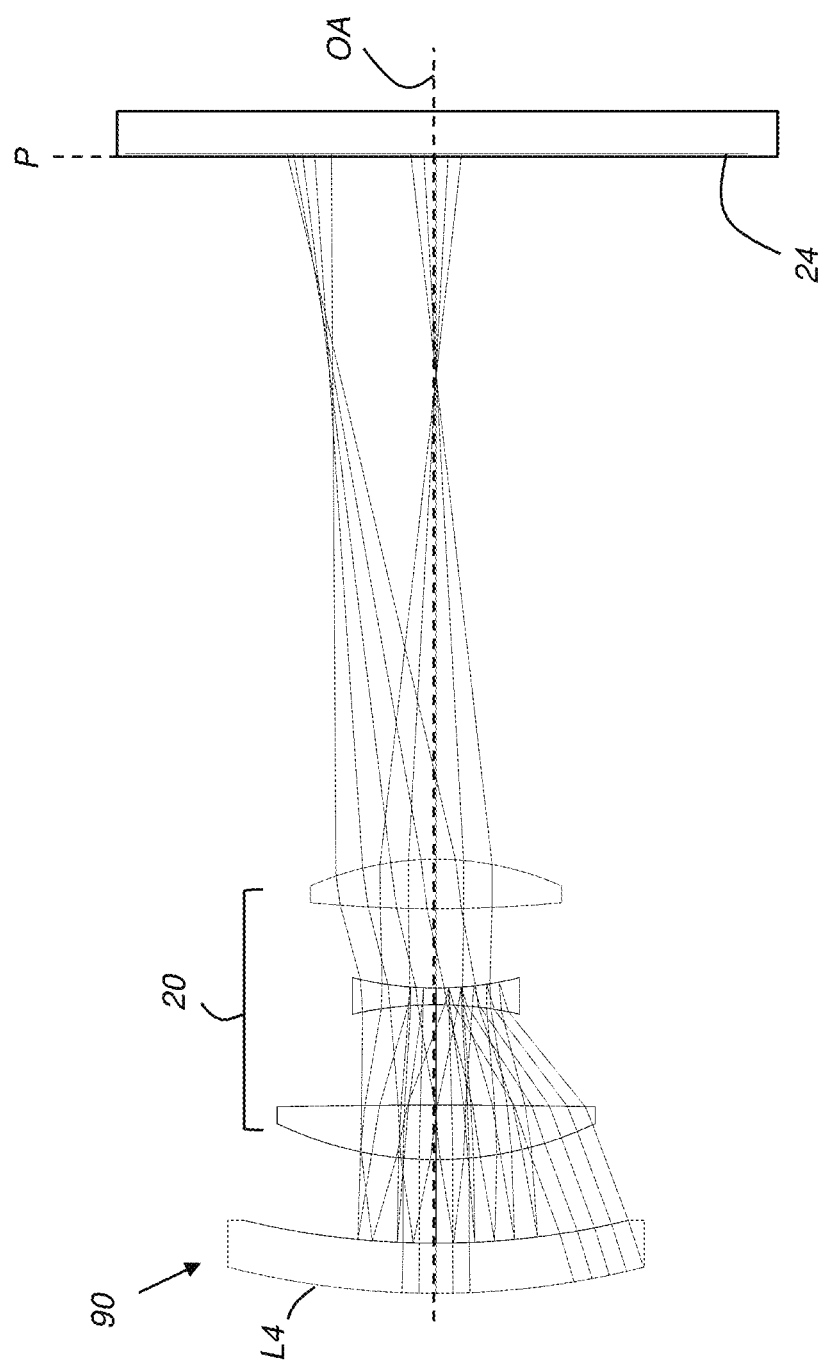
FIG. 26 shows generation of both on- and off-axis ghost images using the flare lens assembly of FIG. 23.

FIG. 26 shows generation of both on- and off-axis ghost images, combining the ghost image light paths described above using the flare lens assembly 90 of FIG. 23.

Figure 27B:
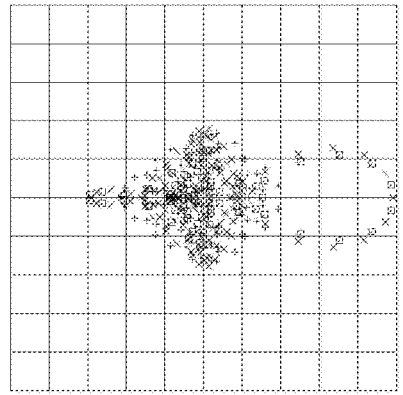
FIGS. 27A and 27B show spot diagrams for the prime lens of FIG. 22.
Figure 27A:
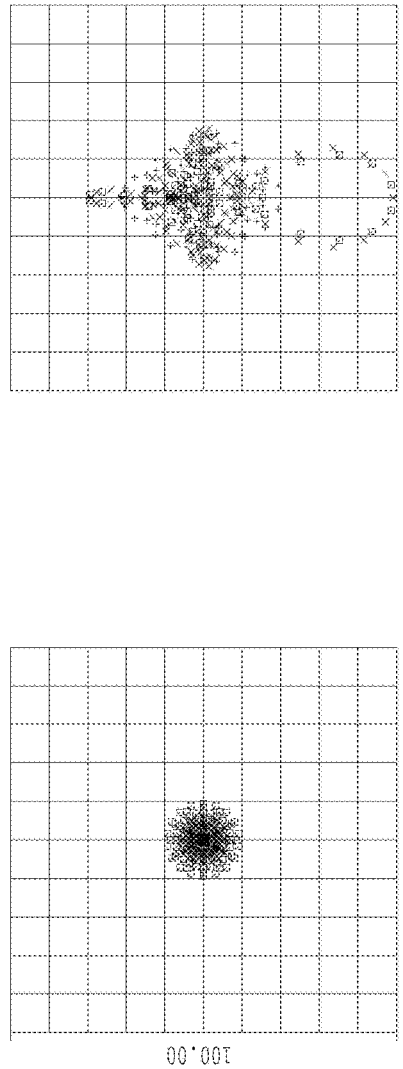

FIGS. 27A and 27B show spot diagrams for the prime lens of FIG. 22.

Figure 28B:
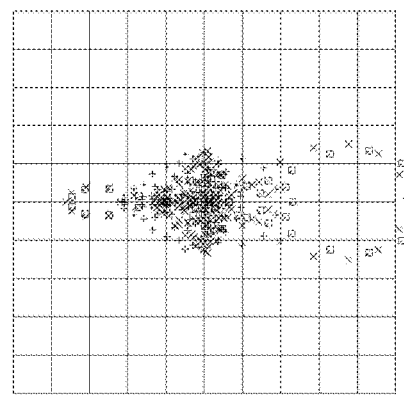
FIGS. 28A and 28B show spot diagrams for the prime lens of FIG. 22 plus lens assembly attachment of FIG. 23.
Figure 28A:
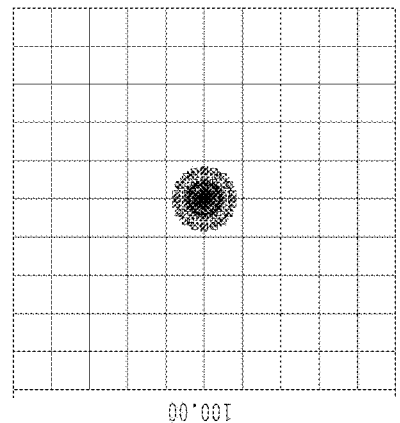

FIGS. 28A and 28B show spot diagrams for the prime lens of FIG. 22 plus lens assembly attachment of FIG. 23.

Lens Materials and Fabrication

Lens elements can be formed using various types of optical glass or plastic. High-index optical plastics can be used, for example. Lens surface shapes can be spherical, aspheric, or diffractive.

By way of example, FIG. 21 lists surface and fabrication details for the lens attachment embodiment of flare lens assembly 10 in FIG. 1.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. A removable camera lens attachment comprising at least two optical elements, wherein the at least two optical elements are aligned to share an optical axis with a prime lens of the camera,
   wherein the lens attachment has at least two curved surfaces,
   wherein the at least two optical elements have a first surface that is conditioned to reflect a first portion of the incident light away from the image plane as reflected stray light and a second surface that is conditioned to reflect a second portion of the reflected stray light back toward the image plane to form a ghost image on an image plane of the prime lens,
   wherein the lens attachment alters the effective focal length of the prime lens by no more than 15%.

2. The removable camera lens attachment of claim 1 wherein the lens attachment alters the effective focal length by no more than 10%.

3. The removable camera lens attachment of claim 1 wherein the lens attachment alters the effective focal length by no more than 5%.

4. The removable camera lens attachment of claim 1 wherein the optical element nearest the object is a meniscus lens.

5. The removable camera lens attachment of claim 4 further comprising a plano plate.

6. The removable camera lens attachment of claim 1 wherein the first and second surfaces form a first pair of surfaces that form the ghost image as a first ghost image at a first position on the image plane
   and further comprising a second pair of surfaces that reflect a third portion of the incident light away from and back toward the image plane to form a second ghost image at a second position on the image plane,
   and wherein the first and second positions lie on opposite sides of the optical axis.

7. The removable camera lens attachment of claim 1 wherein the attachment attaches to a personal communications device.

8. The removable camera lens attachment of claim 1 wherein the attachment attaches to the object side of a prime lens.

9. The removable camera lens attachment of claim 1 wherein the attachment attaches to the image side of a prime lens.

10. The removable camera lens attachment of claim 1 wherein there is a first reflectance percentage value of a first surface of one of the at least two optical elements, averaged over the visible range from 450 to 650 nm, and a second reflectance percentage value of a second surface of one of the at least two optical elements, averaged over the visible range from 450 to 650 nm, and wherein a multiplicative product of the first reflectance and second reflectance values exceeds 0.0001.

11. The removable camera lens attachment of claim 1 wherein optical surface coatings on one or more surfaces of the optical elements attenuate reflection of stray light over at least one predetermined range of wavelengths.

12. A removable camera lens attachment configured for attachment to a prime lens of a camera and comprising:
   at least a first transmissive optic having a first and a second surface and a second transmissive optic having a third and a fourth surface,
   wherein at least two of the first, second, third, and fourth surfaces are curved,
   wherein, a multiplicative product of average reflectance for at least one pair of the surfaces of the attachment exceeds 0.0001, and
   wherein a twice-reflected portion of light between the at least one pair of the surfaces is conveyed to an image plane of the prime lens as a ghost image.

13. The attachment of claim 12 wherein the reflectance of both surfaces in the pair is averaged over the visible range from 450 to 650 nm.

14. The attachment of claim 12 wherein the second transmissive optic is a transmissive plate.

15. The attachment of claim 12 wherein the average reflectance of one or more of the surfaces of the pair exceeds 4%.

16. The attachment of claim 12 wherein the lens attachment has an optical power that alters the effective focal length (EFL) of the prime lens by no more than 15%.

17. A removable camera lens attachment configured for alignment along an optical axis of a prime lens that defines the image plane of a camera, wherein the lens attachment comprises at least one transmissive optic, wherein the at least one transmissive optic has at least one partially reflective surface that is conditioned to redirect stray light that has been reflected away from the image plane back toward the image plane as a ghost image.

* * * * *